(12) United States Patent
Gaur et al.

(10) Patent No.: US 9,967,620 B2
(45) Date of Patent: May 8, 2018

(54) VIDEO HIGHLIGHTS FOR STREAMING MEDIA

(75) Inventors: Sachin Gaur, Ghaziabad (IN); Ganesh Sahai, Noida (IN); Anmol Dhawan, Ghaziabad (IN); Sachin Soni, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 1587 days.

(21) Appl. No.: 11/724,871

(22) Filed: Mar. 16, 2007

(65) Prior Publication Data

US 2014/0033036 A1    Jan. 30, 2014

(51) Int. Cl.
*H04N 7/12*         (2006.01)
*H04N 21/45*        (2011.01)
*H04N 21/442*       (2011.01)
*H04N 21/472*       (2011.01)
(Continued)

(52) U.S. Cl.
CPC ... *H04N 21/4532* (2013.01); *H04N 21/44204* (2013.01); *H04N 21/4756* (2013.01); *H04N 21/47217* (2013.01); *H04N 21/8456* (2013.01)

(58) Field of Classification Search
CPC .......................... H04N 21/45; H04N 21/4532
USPC .......... 375/240.26; 725/91, 92, 93; 707/755, 707/999.03
See application file for complete search history.

(56) References Cited

U.S. PATENT DOCUMENTS 5,054,360 A    10/1991  Lisle et al.
5,883,804 A    3/1999   Christensen
6,094,671 A    7/2000   Chase et al.
(Continued)

FOREIGN PATENT DOCUMENTS

WO    WO-2001035290 A1    5/2001
WO    WO-2002019720 A2    3/2002
(Continued)

OTHER PUBLICATIONS

"Get Comments Quickly With Clip Notes", [online]. © Adobe Systems Incorporated, 2006. [created Jan. 17, 2006]. Retrieved from the Internet: <URL: http://www.adobe.com/designcenter/premiere/articles/prp2it_clipnotes/prp2it_clipnotes.pdf>, (2006), 3 pgs.

(Continued)

*Primary Examiner* — Farid Homayounmehr
*Assistant Examiner* — Suman Debnath
(74) *Attorney, Agent, or Firm* — Shook, Hardy & Bacon L.L.P.

(57) ABSTRACT

In one embodiment, a computer system is described as including a receiver to receive selection data, the selection data relating to a number of times a particular portion of digital content has been accessed, and an updating module to update selection data contained in a database record relating to digital content, the database record containing a sum of selection data. Further, a Graphical User Interface (GUI) is described as including a display and a selection device, a method of providing and selecting from a pane on the display, the method comprising retrieving a set of data to be displayed in the pane, displaying the data in the pane, receiving a selection input signal indicative of the selection device pointing at a selected position within the pane, and in response to the input signal, playing a portion of a data file.

15 Claims, 22 Drawing Sheets

(51) Int. Cl.
H04N 21/475 (2011.01)
H04N 21/845 (2011.01)

(56) References Cited

U.S. PATENT DOCUMENTS

| | | | |
|---|---|---|---|
| 6,389,541 | B1 | 5/2002 | Patterson |
| 6,523,069 | B1 | 2/2003 | Luczycki et al. |
| 6,553,412 | B1 | 4/2003 | Kloba et al. |
| 6,834,195 | B2 | 12/2004 | Brandenberg et al. |
| 6,892,193 | B2 | 5/2005 | Bolle et al. |
| 6,961,714 | B1 | 11/2005 | LeVlne |
| 7,308,413 | B1 | 12/2007 | Tota et al. |
| 7,797,352 | B1 | 9/2010 | Hopwood et al. |
| 7,849,487 | B1 | 12/2010 | Vosseller |
| 8,001,143 | B1 | 8/2011 | Gupta et al. |
| 2002/0023058 | A1 | 2/2002 | Taniguchi et al. |
| 2002/0033844 | A1 | 3/2002 | Levy et al. |
| 2002/0069218 | A1 | 6/2002 | Sull et al. |
| 2002/0092019 | A1 | 7/2002 | Marcus |
| 2002/0097265 | A1* | 7/2002 | Kurapati et al. ............. 345/747 |
| 2002/0163532 | A1 | 11/2002 | McGee et al. |
| 2003/0004966 | A1 | 1/2003 | Bolle et al. |
| 2003/0028896 | A1 | 2/2003 | Swart et al. |
| 2003/0128880 | A1 | 7/2003 | Akimoto et al. |
| 2003/0135464 | A1 | 7/2003 | Mourad et al. |
| 2003/0203713 | A1 | 10/2003 | Onishi |
| 2004/0002993 | A1 | 1/2004 | Toussaint et al. |
| 2004/0088729 | A1* | 5/2004 | Petrovic et al. ................ 725/91 |
| 2004/0128317 | A1 | 7/2004 | Sull et al. |
| 2005/0015713 | A1 | 1/2005 | Plastina et al. |
| 2005/0122960 | A1 | 6/2005 | Khan |
| 2005/0165795 | A1 | 6/2005 | Myka et al. |
| 2005/0152666 | A1 | 7/2005 | Demeyer |
| 2005/0203927 | A1 | 9/2005 | Sull et al. |
| 2005/0283791 | A1 | 12/2005 | McCarthy et al. |
| 2005/0288991 | A1 | 12/2005 | Hubbard et al. |
| 2006/0059526 | A1 | 3/2006 | Poslinski |
| 2006/0078292 | A1 | 4/2006 | Huang et al. |
| 2006/0092282 | A1 | 5/2006 | Herley et al. |
| 2006/0121987 | A1 | 6/2006 | Bortnik et al. |
| 2006/0156357 | A1* | 7/2006 | Lockridge .......... H04N 7/17318 725/90 |
| 2006/0190616 | A1 | 8/2006 | Mayerhofer et al. |
| 2007/0038931 | A1 | 2/2007 | Allaire et al. |
| 2007/0078898 | A1* | 4/2007 | Hayashi et al. ........... 707/104.1 |
| 2007/0106660 | A1 | 5/2007 | Stern et al. |
| 2007/0112639 | A1* | 5/2007 | Blumenau ............... G06F 11/34 709/224 |
| 2007/0157220 | A1* | 7/2007 | Cordray ................ H04H 60/65 725/9 |
| 2007/0168542 | A1 | 7/2007 | Gupta et al. |
| 2007/0169165 | A1* | 7/2007 | Crull ................... G06F 17/3089 725/135 |
| 2007/0206020 | A1* | 9/2007 | Duffield ................ G06T 1/0085 345/522 |
| 2007/0214485 | A1 | 9/2007 | Bodin et al. |
| 2008/0052343 | A1* | 2/2008 | Wood ........................... 709/202 |
| 2008/0056297 | A1 | 3/2008 | Gaur et al. |
| 2008/0306936 | A1 | 12/2008 | Ho et al. |
| 2009/0271514 | A1* | 10/2009 | Thomas et al. .............. 709/224 |
| 2010/0325641 | A1* | 12/2010 | Holmes et al. ............... 719/316 |

FOREIGN PATENT DOCUMENTS

| | | |
|---|---|---|
| WO | WO-2005025217 A1 | 3/2005 |
| WO | WO-2005125190 A2 | 12/2005 |

OTHER PUBLICATIONS

"How to Create and Use Flash Video Metadata to Add Cue-Points With flvtool2", [online]. [archived on Dec. 8, 2006; retrieved on Jan. 6, 2007]. Retrieved from the Internet: <URL: http://www.ioncannon.net/web-design/109/metadata-cuepoint-flash-video-flvtool/, 6 pgs.

"The Vote Average for Film X Should be Y! Why Are You Displaying Another Rating?", [online]. (c) 1990-2006, Internet Movie Database, Inc. [retrieved on Apr. 27, 2006]. Retrieved from the Internet: <URL: http://msn-uk.imdb.com/help/show_leaf?voteaverage>, 2 pgs.

Moorer, J. A., "The Digital Audio Processing Station: A New Concept in Audio Postproduction", *J. Audio Eng. Soc.*, 34(6) (Jun. 1986), 454-463.

Smith, J. O., "Unit Generator Implementation on the Next DSP Chip", *Proceedings of the International Computer Music Conference*, 1989, (1989), 303-306.

"Star Wars", http://sebastianheycke.de/a_starwars/movie2.html, (Downloaded Sep. 10, 2007).

Girgensohn, A., et al., "Facilitating Video Access by Visualizing Automatic Analysis", *Human-Computer Interaction INTERACT '99*, IOS Press, (1999),205-212.

Lee, Hyowon, "The Fischlar Digital Video Recording, Analysis and Browsing System", *Proceedings of RIAO '2000: ContentBased Multimedia Information Access*, Paris, France.,(Apr. 12-14, 2000),1-10.

"U.S. Appl. No. 11/444,642 Non Final Office Action dated Aug. 18, 2009", 12 pgs.

"U.S. Appl. No. 11/444,642, Response filed Nov. 13, 2009 to Non Final Office Action dated Aug. 18, 2009", 19 pgs.

"U.S. Appl. No. 11/669,002, Final Office Action dated Jul. 9, 2009", 20 pgs.

"U.S. Appl. No. 11/669,002, Non-Final Office Action dated Jan. 23, 2009", 17 pgs.

"U.S. Appl. No. 11/669,002, Response filed Apr. 21, 2009 to Non Final Office Action dated Jan. 23, 2009", 11 pgs.

"U.S. Appl. No. 11/669,002, Response filed Dec. 9, 2009 to Final Office Action dated Jul. 9, 2009", 10 pgs.

"U.S. Appl. No. 11/820,586, Non-Final Office Action dated Nov. 20, 2009", 10 pgs.

"U.S. Appl. No. 11/820,586, Response filed Aug. 21, 2009 to Restriction Requirement dated Jul. 23, 2009", 7 pgs.

"U.S. Appl. No. 11/820,586, Restriction Requirement dated Jul. 23, 2009", 6 pgs.

"U.S. Appl. No. 11/444,642, Appeal Brief filed Mar. 31, 2011", 28 pgs.

"U.S. Appl. No. 11/669,002, Final Office Action dated Sep. 15, 2011", 12 pgs.

"U.S. Appl. No. 11/713,959, Non Final Office Action dated Nov. 16, 2011", 8 pgs.

"U.S. Appl. No. 12/875,276, Response filed Dec. 5, 2011 to Non Final Office Action dated Sep. 7, 2011", 10 pgs.

"U.S. Appl. No. 11/444,642, Examiner Interview Summary dated Apr. 12, 2010", 3 pgs.

"U.S. Appl. No. 11/444,642, Examiner Interview Summary dated Jul. 13, 2010", 3 pgs.

"U.S. Appl. No. 11/444,642, Final Office Action dated Feb. 8, 2010", 16 pgs.

"U.S. Appl. No. 11/444,642, Final Office Action dated Oct. 25, 2010", 16 pgs.

"U.S. Appl. No. 11/444,642, Non-Final Office Action dated May 25, 2010", 12 pgs.

"U.S. Appl. No. 11/444,642, Notice of Allowance dated May 9, 2011", 9 pgs.

"U.S. Appl. No. 11/444,642, Notice of Allowance dated Jun. 8, 2011", 5 pgs.

"U.S. Appl. No. 11/444,642, Notice of Panel Decision mailed Mar. 1, 2011", 2 pgs.

"U.S. Appl. No. 11/444,642, Pre-Appeal Brief filed Jan. 25, 2011", 5 pgs.

"U.S. Appl. No. 11/444,642, Response filed Aug. 20, 2010 to Non-Final Office Action dated May 25, 2010", 13 pgs.

"U.S. Appl. No. 11/444,642, Response filed May 10, 2010 to Final Office Action dated Feb. 8, 2010", 15 pgs.

"U.S. Appl. No. 11/669,002, Final Office Action dated Oct. 8, 2010", 17 pgs.

"U.S. Appl. No. 11/669,002, Non-Final Office Action dated Mar. 22, 2011", 20 pgs.

(56) References Cited

OTHER PUBLICATIONS

"U.S. Appl. No. 11/669,002, Non-Final Office Action dated Apr. 7, 2010", 19.
"U.S. Appl. No. 11/669,002, Response filed Jan. 10, 2011 to Final Office Action dated Oct. 8, 2010", 11 pgs.
"U.S. Appl. No. 11/669,002, Response filed Jun. 22, 2011 to Non Final Office Action dated Mar. 22, 2011", 7 pgs.
"U.S. Appl. No. 11/669,002, Response filed Jul. 7, 2010 to Non Final Office Action dated Apr. 7, 2010", 11 pgs.
"U.S. Appl. No. 11/713,959, Response filed Aug. 29, 2011 to Restriction Requirement dated Aug. 11, 2011", 9 pgs.
"U.S. Appl. No. 11/713,959, Restriction Requirement dated Aug. 11, 2011", 6 pgs.
"U.S. Appl. No. 11/820,586, Notice of Allowance dated May 28, 2010", 12 pgs.
"U.S. Appl. No. 11/820,586, Response filed Feb. 10, 2010 to Non-Final Office Action dated Nov. 20, 2009", 8 pgs.
"U.S. Appl. No. 12/875,276, Final Office Action dated Mar. 28, 2011", 10 pgs.
"U.S. Appl. No. 12/875,276, Non-Final Office Action dated Sep. 7, 2011", 8 pgs.
"U.S. Appl. No. 12/875,276, Non-Final Office Action dated Oct. 15, 2010", 12 pgs.
"U.S. Appl. No. 12/875,276, Response filed Jan. 18, 2011 to Non-Final Office Action dated Oct. 15, 2011", 11 pgs.
"U.S. Appl. No. 12/875,276, Response filed Jun. 28, 2011 to Non-Final Office Action dated Mar. 28, 2011", 9 pgs.
Almeida, Pedro, et al., "SInBAD—A Digital Library to Aggregate Multimedia Documents", Proceedings of the Advanced International Conference on Telecommunications and International Conference on Internet and Web Applications and Services, (2006), 6 pgs.
Doenges, Peter K, et al., "Audio/Video and Synthetic Graphics/Audio for Mixed Media", Signal Processing: Image Communication 9, (1997), 433-463.
Minerva Yeung, et al., "Extracting story units from long programs for video browsing and navigation", IEEE, (Jun. 17-23, 1996), 296-305.
O'Connor, et al., "News story segmentation in the Fischlar video indexing system", vol. 3, IEEE, (2001), 418-421.
"U.S. Appl. No. 11/669,002, Examiner Interview Summary mailed dated Jan. 16, 2013", 3 pgs.
"U.S. Appl. No. 11/669,002, Examiner Interview Summary dated Jul. 11, 2012", 3 pgs.
"U.S. Appl. No. 11/669,002, Final Office Action dated Dec. 5, 2012", 10 pgs.
"U.S. Appl. No. 11/669,002, Non Final Office Action dated May 25, 2012", 8 pgs.
"U.S. Appl. No. 11/669,002, Response filed Aug. 27, 2012 to Non Final Office Action dated May 25, 2012", 8 pgs.
"U.S. Appl. No. 11/713,959, Final Office Action dated Jun. 21, 2012", 15 pgs.
"U.S. Appl. No. 11/713,959, Response filed Sep. 21, 2012 to Final Office Action dated Jun. 21, 2012", 11 pgs.
"U.S. Appl. No. 12/875,276, Appeal Brief filed Sep. 11, 2012", 18 pgs.
"U.S. Appl. No. 12/875,276, Decision on Pre-Appeal Brief mailed Jul. 11, 2012", 2 pgs.
"U.S. Appl. No. 12/875,276, Examiner's Answer dated Dec. 7, 2012", 8 pgs.
"U.S. Appl. No. 11/713,959, Non Final Office Action dated Jan. 3, 2014", 15 pgs.
U.S. Appl. No. 11/669,002, Response filed Jan. 20, 2012 to Final Office Action dated Sep. 15, 2011, 11 pgs.
U.S. Appl. No. 11/713,959, Response filed Feb. 16, 2012 to Non Final Office Action dated Nov. 16, 2011, 11 pgs.
U.S. Appl. No. 12/875,276, Final Office Action dated Feb. 6, 2012, 9 pgs.
U.S. Appl. No. 12/875,276, Pre-Appeal Brief Request for Review filed May 7, 2012, 4 pgs.

* cited by examiner

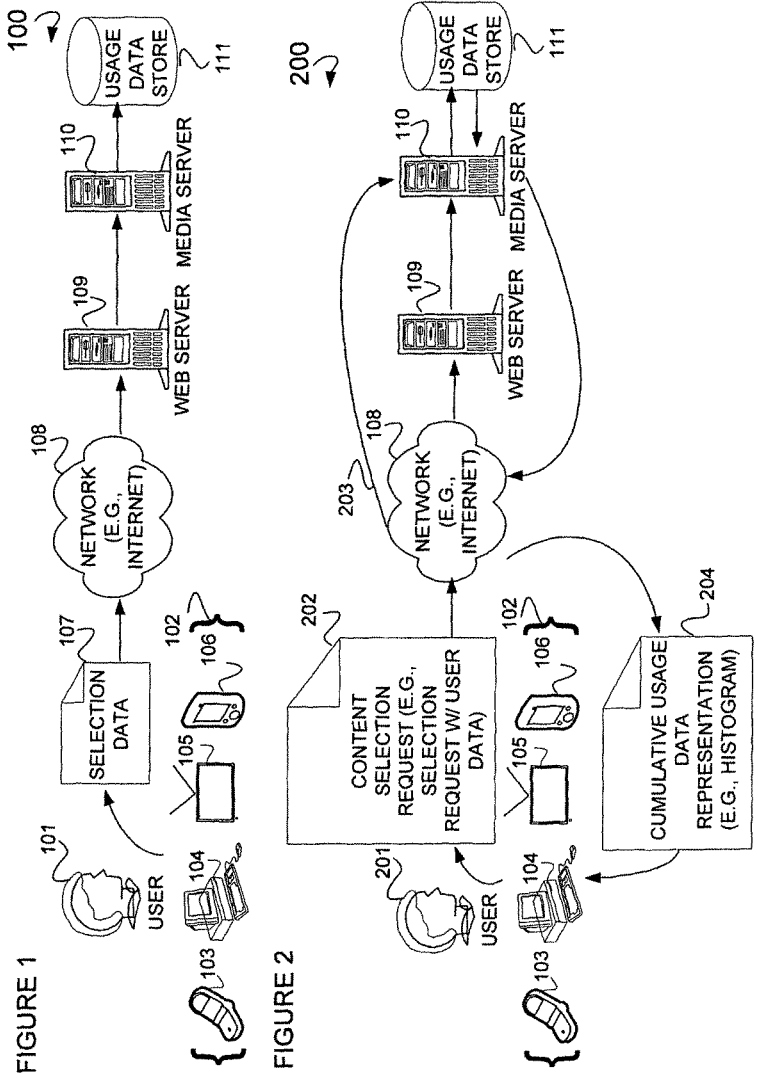

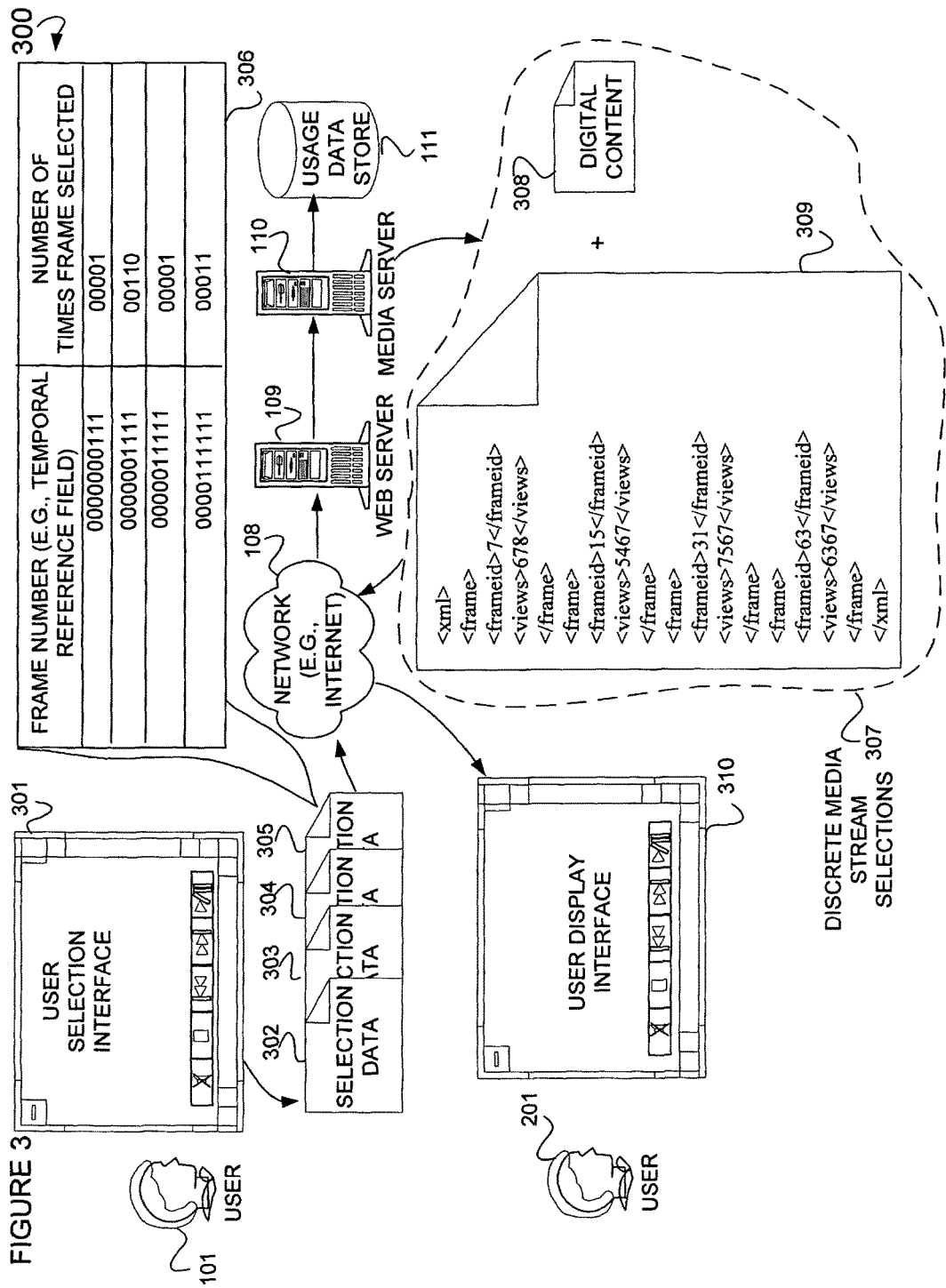

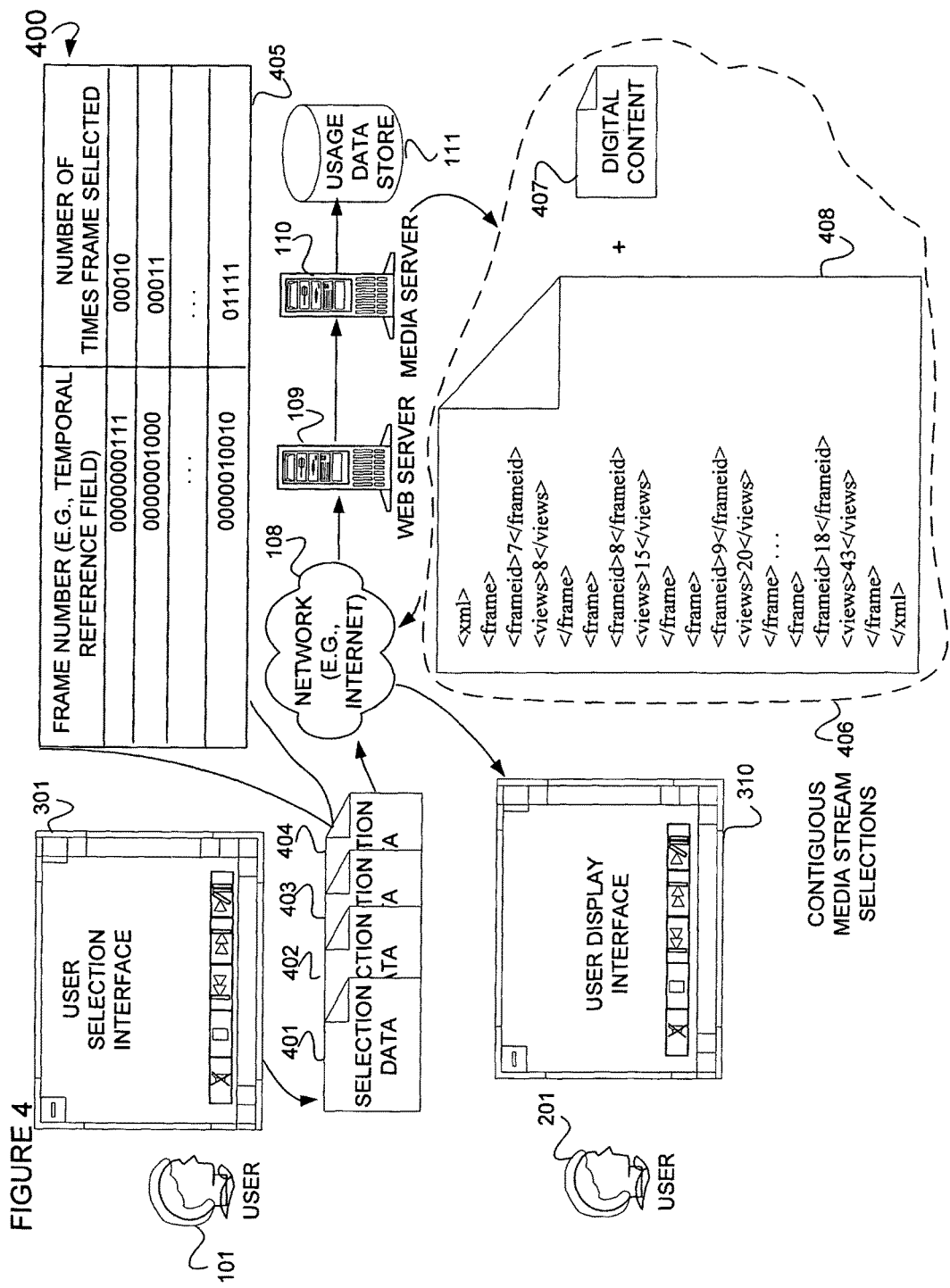

FIGURE 28

| FRAME NUMBER (E.G., TEMPORAL REFERENCE FIELD) | NUMBER OF TIMES FRAME SELECTED |
|---|---|
| 0000000111 | 00010 |
| 0000001000 | 00011 |
| ... | ... |
| 0000010010 | 01111 |

2801

+

| FRAME NUMBER (E.G., TEMPORAL REFERENCE FIELD) | TOTAL NUMBER OF TIMES FRAME SELECTED |
|---|---|
| 0000000111 | 00110 |
| 0000001000 | 01100 |
| ... | ... |
| 0000010010 | 11100 |

2802

=

| FRAME NUMBER (E.G., TEMPORAL REFERENCE FIELD) | TOTAL NUMBER OF TIMES FRAME SELECTED |
|---|---|
| 0000000111 | 1000 |
| 0000001000 | 1111 |
| ... | ... |
| 0000010010 | 101011 |

2803

→ USAGE DATA STORE 111

2901 NAME OF DIGITAL CONTENT

2902 NUMBER OF TIMES VIEWED

2903 → FRAME NUMBER (E.G., TR VALUE)

VIDEO HIGHLIGHTS FOR STREAMING MEDIA

CROSS REFERENCE TO RELATED APPLICATIONS

This is a non-provisional patent application that is related to United States Patent Application titled: "AGGREGATING CHARACTERISTIC INFORMATION FOR DIGITAL CONTENT" (application Ser. No. 11/444,642) and United States Patent Application titled: "AUTOMATIC VIDEO HIGHLIGHTS USING A RATING SYSTEM" (application Ser. No. 11/669,002) that is incorporated by reference in its entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright © 2007, Adobe Systems Incorporated. All Rights Reserved.

TECHNICAL FIELD

Example embodiments relate generally to the technical field of algorithms and programming and, in one specific example, to the generation and use of selection data to select and/or rating of digital content or portions thereof.

BACKGROUND

Viewers of digital content often desire to skip portions of the digital content that they deem irrelevant, undesirable, or otherwise deem not important to view. This lack of interest in viewing a portion of digital content may be expressed by the viewer using such functions as the fast-forward function or mode common on many media player applications. Further, a viewer may choose to use, for example, the scroll bar function of a media player to view desirable portions of digital content.

BRIEF DESCRIPTION OF THE DRAWINGS

Some embodiments are illustrated by way of example and not limitation in the figures of the accompanying drawings in which:

FIG. 1 is a diagram of a system to generate selection data, according to an example embodiment.

FIG. 2 is a diagram illustrating a system used to make a content selection request and to provide a cumulative data representation in response to this request, according to an example embodiment FIG. 3 is a diagram of a system illustrating the generation of selection data and the providing of a media stream with a metadata file header inserted at the beginning of this stream to denote the cumulative usage data, according to an example embodiment.

FIG. 4 is a diagram of a system describing the selection of a contiguous media stream, according to an example embodiment.

FIG. 28 is a diagram describing an addition of various tuple values contained in a database, according to an example embodiment.

FIG. 29 is a Relational Data Schema (RDS) illustrating certain database tables associated with a database, according to an example embodiment.

DETAILED DESCRIPTION

Figure 5:
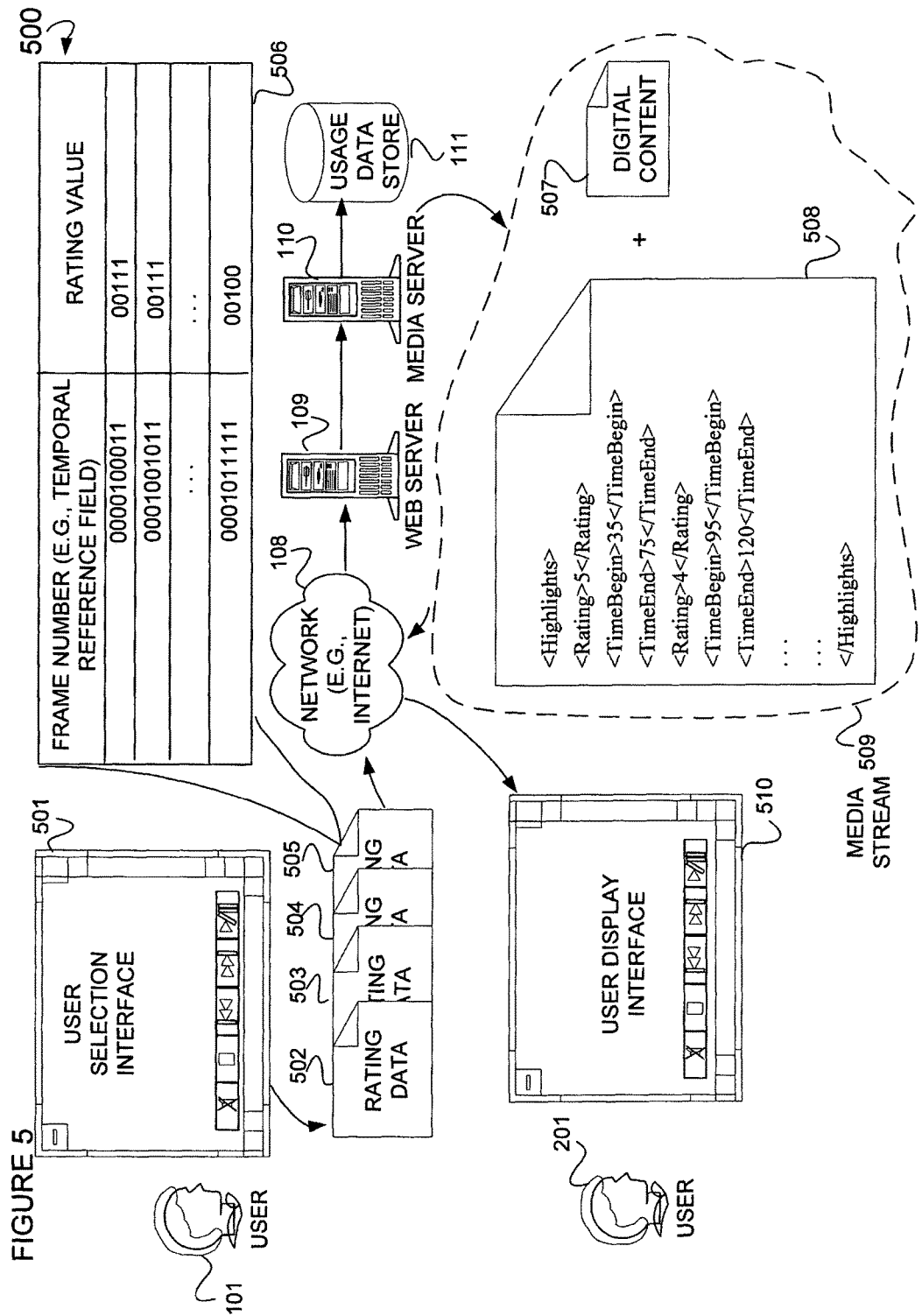
FIG. 5 is a diagram of a system used to insert rating data into a media stream using a metadata file, according to an example embodiment.

Example methods and systems to view discrete portions of video and audio digital content during a fast-forward or reverse method or mode are described. In the following description, for purposes of explanation, numerous specific details are set forth to provide a thorough understanding of example embodiments. It will be evident, however, to one skilled in the art that the present invention may be practiced without these specific details.

According to an embodiment, a system and method for generating and retrieving selection data relating to portions of digital content that a user may choose to view is illustrated. Once selected, this selection data is transmitted across a network for storage. This selection data may then be requested by a user and provided to the requesting user as a cumulative usage data representation such that the requesting user may be able to review those portions of the digital content that have been selected the most number of times by other users reviewing the digital content. The usage data representation may be in the form of a histogram displayed graphically. The user, in some embodiments, may be able to select a portion of this graphic representation (e.g., the portion that has been reviewed the most number of times) for viewing.

Example embodiments may additionally include, a system and method for rating digital content. A rating value is associated with a particular portion of digital content. This rating value may be associated through inserting the rating value directly into the digital content, or may be associated by joining the rating value with the digital content. Based upon this rating value, certain portions of digital content may be extracted and, in some cases, viewed by a user. In one embodiment, a user may view the rated digital content as a series of thumbnail images displayed as sub frames in a Graphical User Interface (GUI).

Other features will be apparent from the accompanying drawings and from the detailed description that follows.

In some embodiments, a user utilizing a user selection interface (e.g., GUI) may generate selection data by selecting one or more pieces of digital content, and portions thereof, for viewing. For example, the user may use a scroll bar, or other screen object or widget, to select a portion of digital content for viewing. Additionally, the user may use a fast-forward method or mode to skip or otherwise avoid undesirable pieces of digital content. Once a piece of digital content is selected or avoided, selection data is generated (e.g., as a selection data file) and transmitted across a network for stage in a database. This selection data may contain data relating to the number of times a piece of content has been selected or avoided, specifically a reference value for a piece of digital content mapped or otherwise associated with one or more frame selection values.

Some embodiments may include a user utilizing a user display interface to make a content (e.g., digital content) selection request from a server, a server that, in turn, retrieves the digital content selection request, and the selection data associated with this digital content. This pairing of selection data and digital content may be through, for example, affixing a metadata file at the beginning of a media stream containing the digital content or through inserting the selection data directly into a field of one or more data packets that make up the media stream. In some embodiments, the aggregation of this selection data may be represented as a histogram. This selection data is paired in some way with the digital content, and provided to the user via the display interface.

In some embodiments, the previously described histogram may be represented graphically such that a user may be able to select portions of this graphical representation for viewing. For example, this histogram, and the selected data contained therein, may be represented graphically as a bar graph wherein vertical bars of varying lengths are illustrated. Each length may correspond to the number of times that one or more users viewed that particular portion of the digital content. A user may be able to click on or otherwise select one or more of these bars that make up the graph and retrieve for viewing that portion of the digital content associated with this bar.

FIG. 1 is a diagram of an example system 100. Illustrated is a user 101 who uses one of many devices 102, including a cell phone 103, computer system 104, television 105, and/or Personal Digital Assistant (PDA) 106 to generate selection data 107. In some embodiments, this selection data is generated by something other than a user 101, but rather is generated by, for example, a computer system implementing an algorithm. Once this selection data 107 is generated, it is transmitted across a network 108 to a web server 109. This web server 109, in turn, provides the selection data 107 to a media server 110 wherein the media server 110 stores the selection data into a database 111. In some embodiments, the selection data, as will be more fully described below, is generated using a user selection interface. In particular, it is generated by the user providing input to the user selection interface. This process for generating and providing selection data will be more fully described below.

FIG. 2 is a diagram illustrating example system 200 used to make a content selection request. Described is a user 201 who, using one of the devices 102, makes a content selection request 202 and transmits this request across the network 108 to a web server 109. Once received by the web server 109, the content selection request 202 is provided to a media server 110. In some embodiments, the content selection request 202 is transmitted across the network 108 directly to the media server 110, via the network connection 203. Once received by the media server 110, the content selection request is used by the media server 110 to select or retrieve the use data associated with the requested content from the usage data store 111. In some embodiments, the media server 110 will then transmit the user data and associated content back across the network 108 to the user 201. More to the point, the media server 110 may transmit a cumulative usage data representation 204 to the user 201 and one of the devices 102 that this user 201 may be operating. In some embodiments, this cumulative usage data representation 204 may be displayed to the user 201 in a histogram bar graph, line graph, thumbnail representation, or some other graphical representation of the usage data associated with a particular piece of content.

Example Case: Generation of Metadata File and Insertion into a Media Stream

FIG. 3 is a diagram of an example system 300 illustrating the generation of selection data and a content selection request. Illustrated is a user 101 who, using a user selection interface 301, generates selection data (e.g., 302, 303, 304, and 305). In some embodiments, this selection data (e.g., 302-305) can be represented in a tabular format, such as table 306. Described in table 306 is a first column titled "Frame Number" that in some embodiments may refer to a Temporal Reference (TR) field that may be used to distinguish a piece of digital content (e.g., a video frame) from other pieces of digital content. Also described is a column titled "Number of Times Frames Selected" wherein a number of values representing the number of times a user, such as user 101, has selected a particular piece of digital content are reflected. As described herein, these values are represented in their binary format. As previously described, this selection data once generated by the user 101 is transmitted across a network 108 ultimately to a media server 110 that stores this selection data into a usage database 111. In some embodiments, in response to a content selection request by, for example, a user 201, a media stream is generated by the media server 110. This media stream represented here as a discrete media stream 307 may, in some embodiments, be composed of a metadata file 309 and a digital content file 308. In some embodiments, the metadata file 309 is written using an eXtensible Markup Language (XML), a flat file, or some other suitable file type. This metadata file, in some embodiments, will be inserted by the media server 110 at the beginning of a media stream. In some cases, various types of data packets, collectively referenced here as digital content file 308, will subsequently follow the metadata file 309. This digital content may, for example, be content formatted using a Real-Time Transport Protocol (RTP), which in turn may use a Motion Picture Experts Group (MPEG) header, and an RTP payload header. Other types of digital content formats may also be implemented. Once this metadata file 309 is asserted at the beginning of, for example, a discrete media stream 307, it is transported across a network 108 ultimately to a user display interface 310 where this digital content file 308 will be displayed to, for example, a user 201. Also displayed to the user 201 is a graphical representation of usage or use data associated with the digital content. This use data will, in some embodiments, be carried within the metadata file. As previously described, it will be represented graphically within the user display interface.

FIG. 4 is a diagram of an example system 400 describing the selection of a contiguous media stream. Illustrated are a variety of selection data (e.g., 401, 402, 403, and 404) that is generated by a user 101 utilizing a user selection interface 301. This selection data (e.g., 401-404) may be represented in a table 405. Described in this table 405 is a first column titled "Frame Number" that presents values that correspond to, for example, a temporal reference field. These frame numbers are listed in a contiguous matter such that a first temporal reference field may have a value of 0000000111 (e.g., 7) whereas a second frame number may have a value of 0000001000 (e.g., 8) and subsequent frame number values will be contiguous in manner. These various selection data (e.g., 401-404) in some embodiments may be transmitted across a network 108 to a web server 109 and ultimately to a media server 110. In some embodiments, this selection data (401-404) may be transmitted across the network 108 directly to the media server 110 without using the web server 109. Once received by the media server 110, either directly or indirectly, the selection data (401-404) will be stored into a usage data store or database 111. In response to a user 201 making a content selection request using a user display interface 310, a contiguous media stream selection may be transmitted by the media server 110 across a network 108. In some cases, this contiguous media stream selection will have a metadata file 408 inserted at the beginning that of the media stream and will have digital content subsequently following the metadata file 408. As previously described, this digital content may be formatted using, for example, an RTP format in conjunction with a MPEG format or some other suitable format. This contiguous media stream 406 will be transmitted by the media server 110 across a network 108 and ultimately displayed to a user 201 on a user display interface 310. In some embodiments, not only will the digital content 407 be displayed on the user display interface 310, but a graphical representation of the usage data relating to each piece of digital content may also be displayed in the form of, for example, a bar graph or some other method of displaying the usage data associated with each piece of digital content.

FIG. 5 is a diagram of an example system 500 used to inserting rating data into a media stream using a metadata file. Illustrated is a user selection interface 501 that is used by a user 101 to generate rating data 502-505. In some embodiments, this rating data is a numerical value (e.g., between 1 and 10) associated with a time values (e.g., a TR value) associated with a data packet such as an MPEG packet. Table 506 illustrates the association between a rating value and a TR value representing in a binary format. Once this rating data 502-505 is generated, it is passed across a network 108 to a media server 110 for storage in a database 111. In some cases, a user 201 using a user display interface 510 may be used to select one or more pieces of rated digital content. In some cases, this rated digital content will be aggregated (e.g., aggregated content) from one or more sources (e.g., source files) of digital content spread out across one or more servers. This aggregated content may be highlights of certain of the one or more pieces that have a certain rating value associated with them. For example, a user 201 may request a piece or potion of an MPEG file with a rating of 5 occurring between the $35^{th}$ TR value and the $75^{th}$ TR values. In some embodiments, minutes or some other unit of measurement may be used in lieu of TR Values. Some embodiments may include the insertion of a metadata file 508 into the beginning of a media stream 509 (e.g., before the digital content 507) that is being sent to a user 201 for viewing on a user display interface 501. This metadata file 508 may be written using an XML.

Example Case: Insertion of Selection Data into a Data Packet

Figure 6:
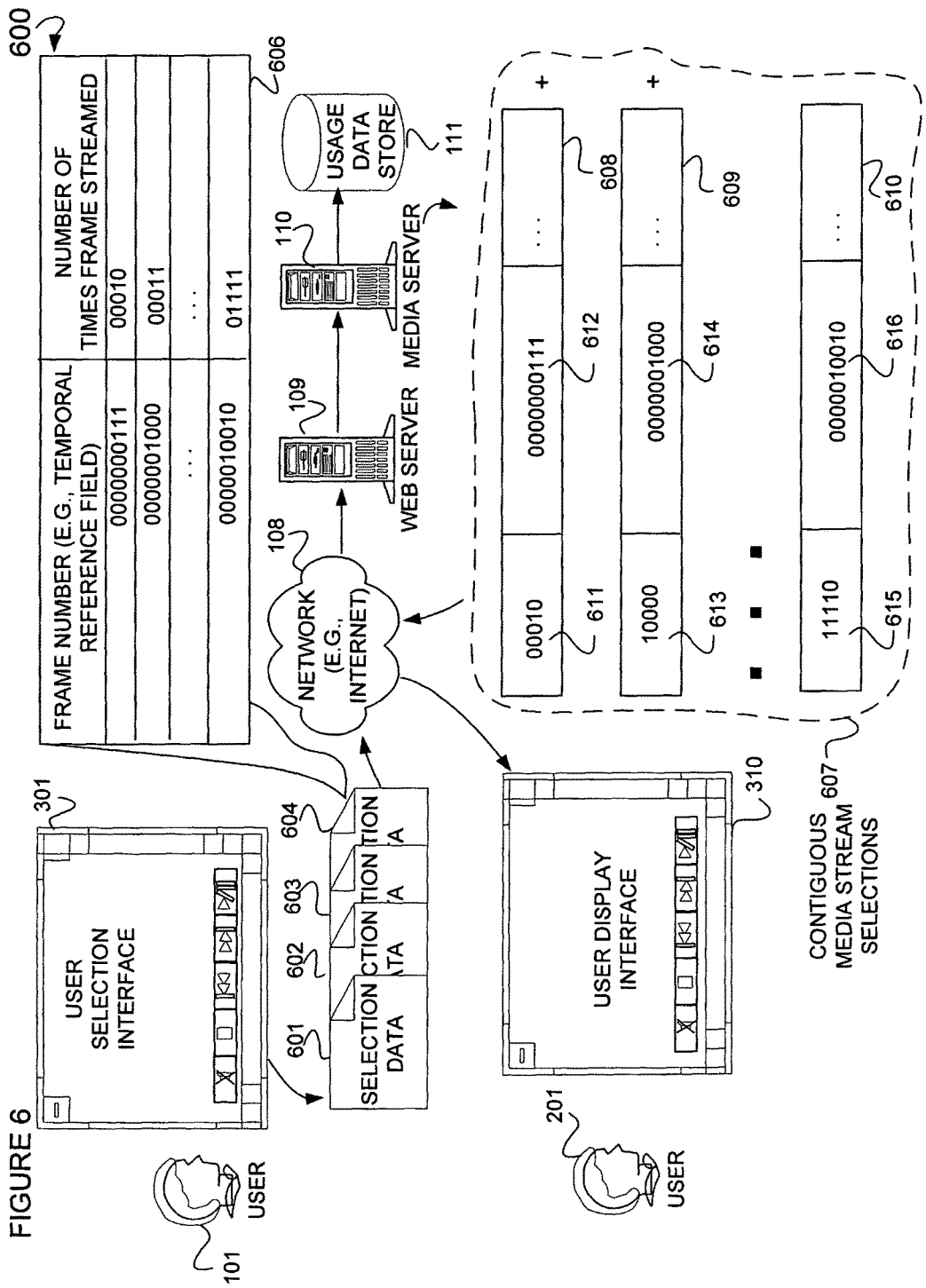
FIG. 6 is a diagram of a system that utilizes a media stream containing data packets where each data packet contains usage data relating to the digital content that is associated with the data packet, according to an example embodiment.

FIG. 6 is a diagram of an example system 600 that uses a media stream containing data packets where each data packet contains usage data relating to the digital content that is associated with the data packet. Illustrated is a user 101 who, utilizing a user selection interface 301, generates the selection data (e.g., 601-604). This selection data is represented via table 606 wherein table 606 contains various tuple entries wherein the first column of the table refers to a particular frame number, which in some cases corresponds to the temporal reference field of a MPEG-specific video packet, and a second column is described that contains a tuple data or tuples representing the number of times that the particular value of a temporal reference field has been selected by, for example, a user 101. This selection data (e.g., 601-604) may, in some cases, be transmitted across a network 108 to a web server 109, which in turn transmits this selection data (e.g., 601-604) to a media server 110 for storage in a usage data store or database 111. In some embodiments, the selection data (e.g., 601-604) is transmitted across a network 108 directly to the media server 110 for storage in the usage data store or database 111. In response to a content selection request made by a user 201 utilizing a user display interface 310, the media server 110 may retrieve digital content in the form of a media stream from the usage data store 111 or from some other database and transmit this media stream across a network 108. Described as a contiguous media stream 607 wherein a number of data packets are assembled to make up this contiguous media stream 607. In some embodiments, these data packets are RTP data packets that may contain, for example, an MPEG-specific header such as the described MPEG-specific video header 608, 609, and 610. With regard to the MPEG-specific video header 608, a must be zero or Must Be Zero (MBZ) field 611 is described that contains a binary value of 2. This MBZ field in the binary value contained therein represents the number of times that a particular frame or data packet has been streamed in response to a user, such as user 101 or user 201's request for the digital content associated with this packet. Each packet, in some cases, may be uniquely identified via a temporal reference field, such as temporal reference field 612 and the value contained therein (e.g., 7). This MPEG-specific video header may be combined with other MPEG-specific video headers to form the previously referenced contiguous media stream 607 such that a second MPEG specific video header 609 that contains a MBZ field 613 and a temporal reference field 614 will be combined with a further MPEG specific video header 610 that also contains a MBZ field 615 and a temporal reference or TR field 616. These MPEG specific video headers may be used in conjunction with other formats and headers to stream digital content. For example, an RTP header may be used to encapsulate an MPEG specific video header and or an MPEG specific audio header and a RTP payload wherein the RTP payload contains the actual digital content (e.g., audio and/or video content) associated with a content selection request or more specifically, provide it in response to a content selection request (e.g., 202). In some embodiments, this media stream may be contiguous, such as media stream 607, whereas in other embodiments this media stream may be discrete. More to the point, in cases where a media stream is contiguous, it contains contiguous data packets such that the data packets are sequential or serial in nature such that the temporal reference values are sequential in nature. By contrast, in cases where the media stream is discrete, it may contain, for example, MPEG specific video headers that have discrete temporal reference values, such that the values themselves are not sequential but are discrete and atomic. Other types of data packet formats may be used in lieu of the RTP and MPEG formats described herein. These various other formats are known in the art.

Figure 7:
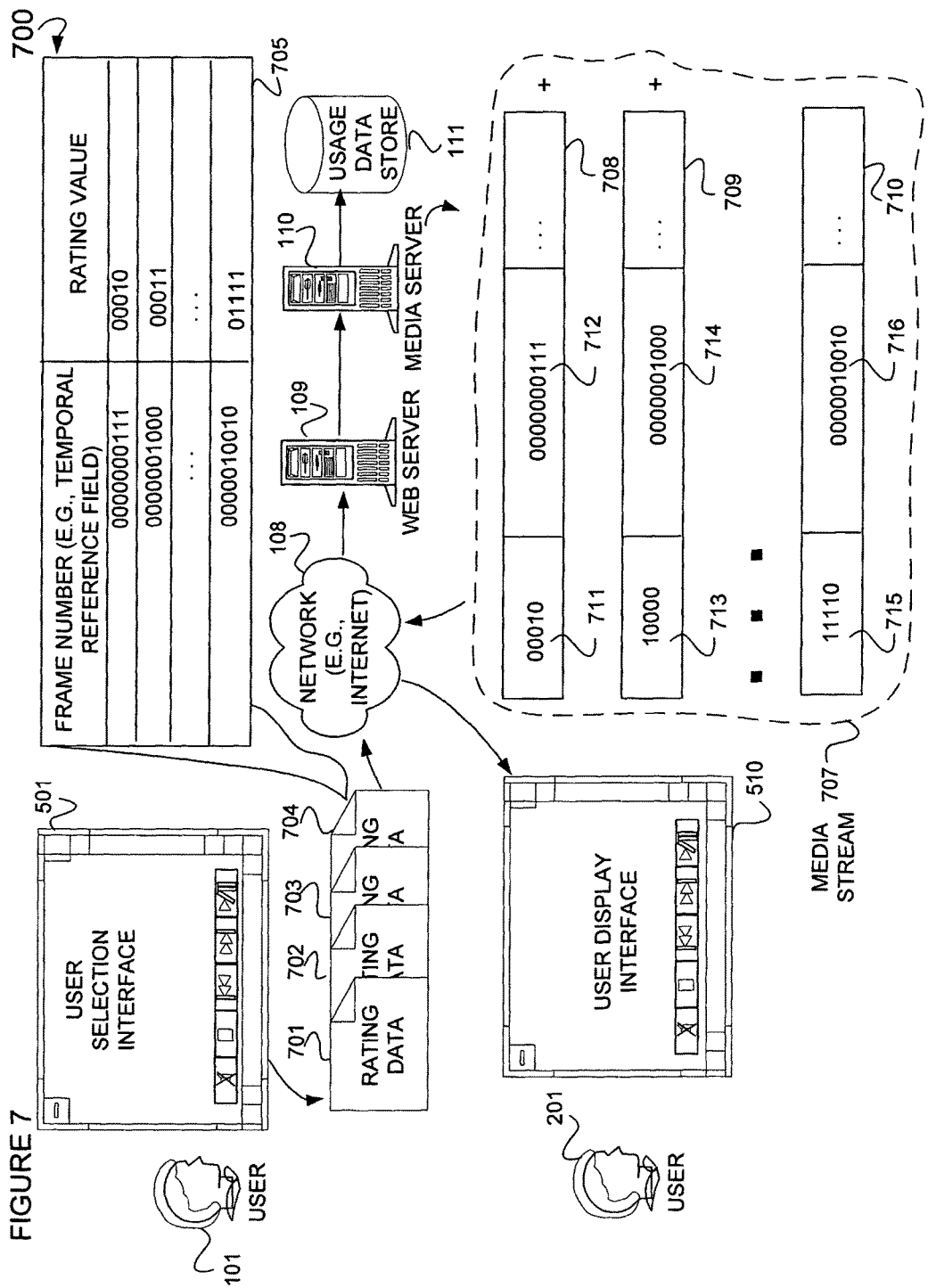
FIG. 7 is a diagram of an example system illustrating the insertion of rating data into the fields of various data packets, according to an example embodiment.

FIG. 7 is a diagram of an example system 700 illustrating the insertion of rating data into the fields of various data packets. Some embodiments may include rating data 701-704 that is generated by a user 101 using a user selection interface 501. This rating data is reflected in table 705, and may be composed of certain rating values associated with a time value, such as a TR value. Once generated and associated, this rating data 701-704 is passed across a network to a media server 110 for storage into a database 111. In some cases, a user 201 using a user display interface 510 will request rated digital content. As previously described, this rated digital content may be requested based upon a range of rating values (e.g., 1-10) for a particular period of time (e.g., a TR value or minute value). Once requested, the rating values will be inserted into a field (e.g., an MBZ of a MPEG video specific header, or unused field of an RTP header) of, for example, an MPEG packet. Fields 712, 714, and 716 reflect the TR fields for an MPEG video specific header, while fields 711, 713, and 715 contain the rating values for each respective packet. Fields 708, 709, and 710 contain addition MPEG specific video header fields. These MPEG packets will then be assembled into a media stream 707 and transported by the media server 110 to the user 201 for viewing using the user display interface 501.

In some embodiments, a metadata file is used to provide selection data for a piece of digital content in the form of a histogram (see e.g., cumulative usage data representation (e.g., histogram) 204)). This selection data may be one or more TR values mapped to the number of times the data packets containing these TR values have been selected. As previously described, these data packets may be RTP formatted data packets containing digital content (e.g., RTP payloads). In some cases, a metadata file, written in XML, contains this histogram representation and associated data. This metadata file may have the following example format:

```
<xml>
<frame>
<frameid>0001</frameid>
<views>5</views>
</frame>
<frame>
<frameid>0002</frameid>
<views>18</views>
</frame>
<frame>
<frameid>0003</frameid>
<views>20</views>
</frame>
<frame>
<frameid>0004</frameid>
<views>3</views>
</frame>
</xml>
```

In instances where a metadata file is implemented, this metadata file is inserted at the beginning of a media stream (see FIGS. 3 and 4 above) to provide instruction as to the number of times a video frames or other pieces of digital content has been reviewed. In some embodiments, a flat file may be used to provide selection data for a piece of digital content. Where a flat file is used, a delimiter may be implemented to distinguish different types of data. This delimiter may be any type of Universal Character Set (Unicode) or American Standard Code for Information Interchange (ASCII) character. For example, the selection data in a flat file could have the form: 0001 5; 0002 18; 0003 20; 0004 3, where the delimiter between ranges of selection data is a semicolon (";"). As with the XML implementation, this flat file may be placed at the beginning of a media stream. In some embodiments, the selection data contain in the metadata file (e.g., an XML file or flat file) is inserted into a lookup table such as that described above.

In cases where selection data and/or cumulative usage data representation (e.g., a metadata file 309) is transported across a network (see, e.g., FIGS. 1-7), a media session is initiated using either a Hyper-Text Transfer Protocol (HTTP) alone or using HTTP in combination with a RTSP. In cases where HTTP alone is used, an HTTP call is made to web server 109 to retrieve (e.g., to GET), for example, a media stream 707 from the media server 110. Once retrieved, the media stream 707 containing the cumulative usage data representation 204 may be played on one or more of the devices 102.

Some embodiments may include the use of HTTP and RTSP together to obtain the cumulative usage data representation 204. In such an embodiment, HTTP would be used to set up a media streaming session between, for example, the web server 109 and media server 110, and one or more of the devices 102. Once the session was established, a presentation description file would be sent from the web server 109 to one of the devices 102. This file may have the following format:

```
<title>SUMMER MOVIES</title>
<session>
    <group language=en lipsync>
        <switch>
            <track type=audio
                e="PCMU/8000/1"
                src = "rtsp://audio.example.com/summermovies/
                audio.en/lofi">
            <track type=audio
                e="DVI4/16000/2" pt="90 DVI4/8000/1"
                src="rtsp://audio.example.com/
                summermovies /audio.en/hifi">
        </switch>
        <track type="video/mpeg"
            src="rtsp://video.example.com/ summermovies/video">
        <selected= yes>
    </group>
</session>
```

In the above example, a selection tag (e.g., <selected=yes>) is provided to put, for example, a media player on notice that for this session, selection data is contained in the RTP data packets (see e.g., FIG. 6 above) and needs to be read by the media player or other device performing or receiving RTP data packets. In some embodiments, a metadata tag (e.g., <metadata=yes>) is provided in lieu of the selection tag so as to instruct the receiving device and application residing thereon that a metadata file is being used to denote those ranges of frames that have been selected and the extent to which they have been selected.

Example Interfaces

Figure 8:
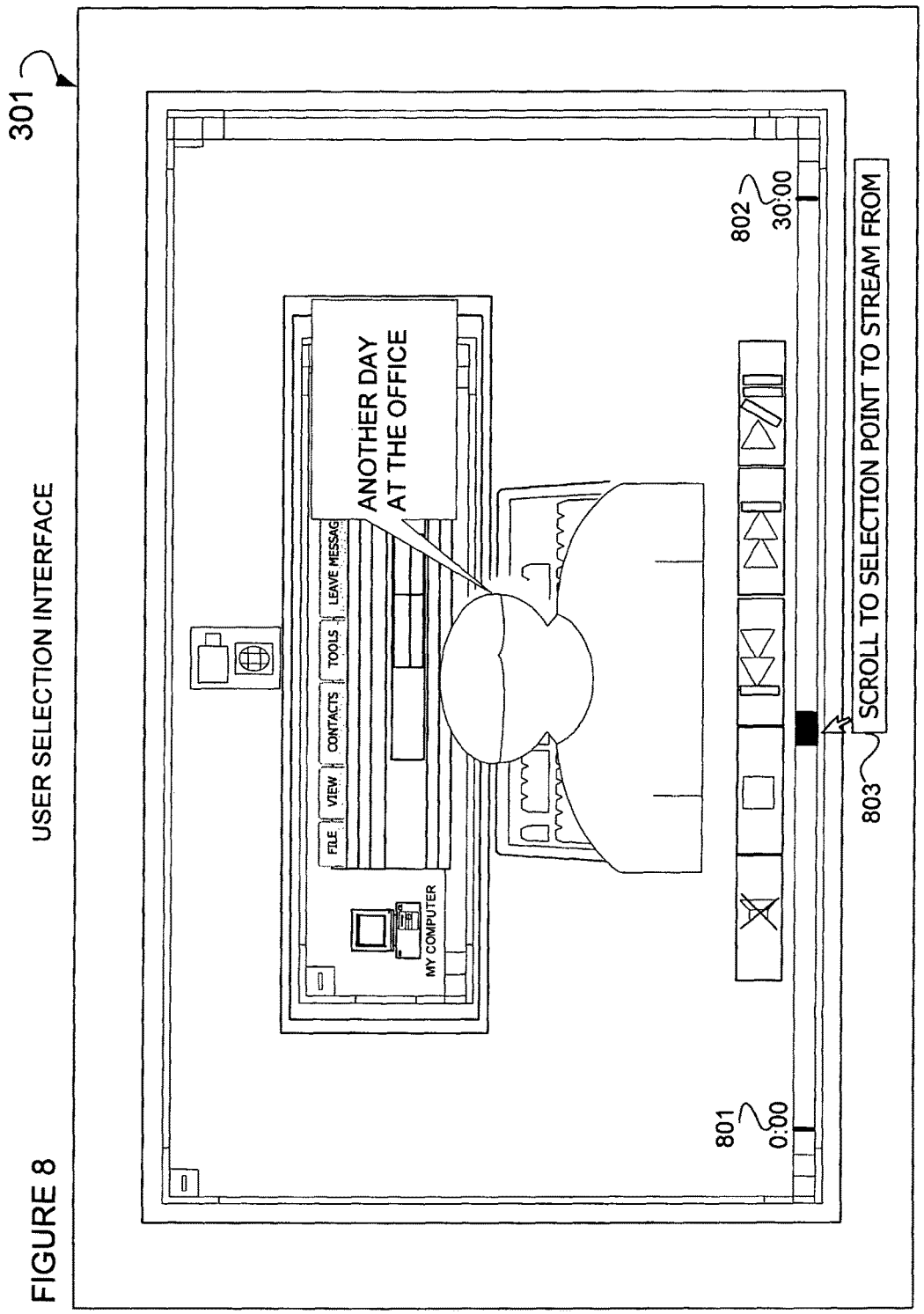
FIG. 8 is a user selection interface, according to an example embodiment.

FIG. 8 is an example user selection interface 301. Illustrated is a start time 801 denoting the start time of a particular piece of digital content, an end time 802 denoting the end point or end time of a particular piece of digital content, and a scroll button 803 used to select the starting point of a particular piece of digital content such that this starting point constitutes selection data. In some embodiments, a user 101 utilizing a user selection interface 301 may use a screen object or widget such as the selection button 803 to select a particular portion of a piece of digital content such that rather than, for example, starting at the beginning of a piece of digital content, the user 101 may choose to review a piece of the digital content at the middle or some other point between the beginning and end of the digital content (e.g., minute 24, 25, 27, etc.). Through the user, using the button 803 to select a particular beginning point in the digital content, the user generates selection data. More to the point, this actually selects a particular frame number that is to start viewing the digital content that is preferable to some other starting point. This frame number, which could be understood as a temporal reference value contained in a temporal reference field, is associated with the actual selection of this time value utilizing the button 803. The various selection data (e.g., 302-305, 401-404, 501-504) are then associated with particular frame numbers (see e.g., table 306, 405, and 506).

Figure 9:
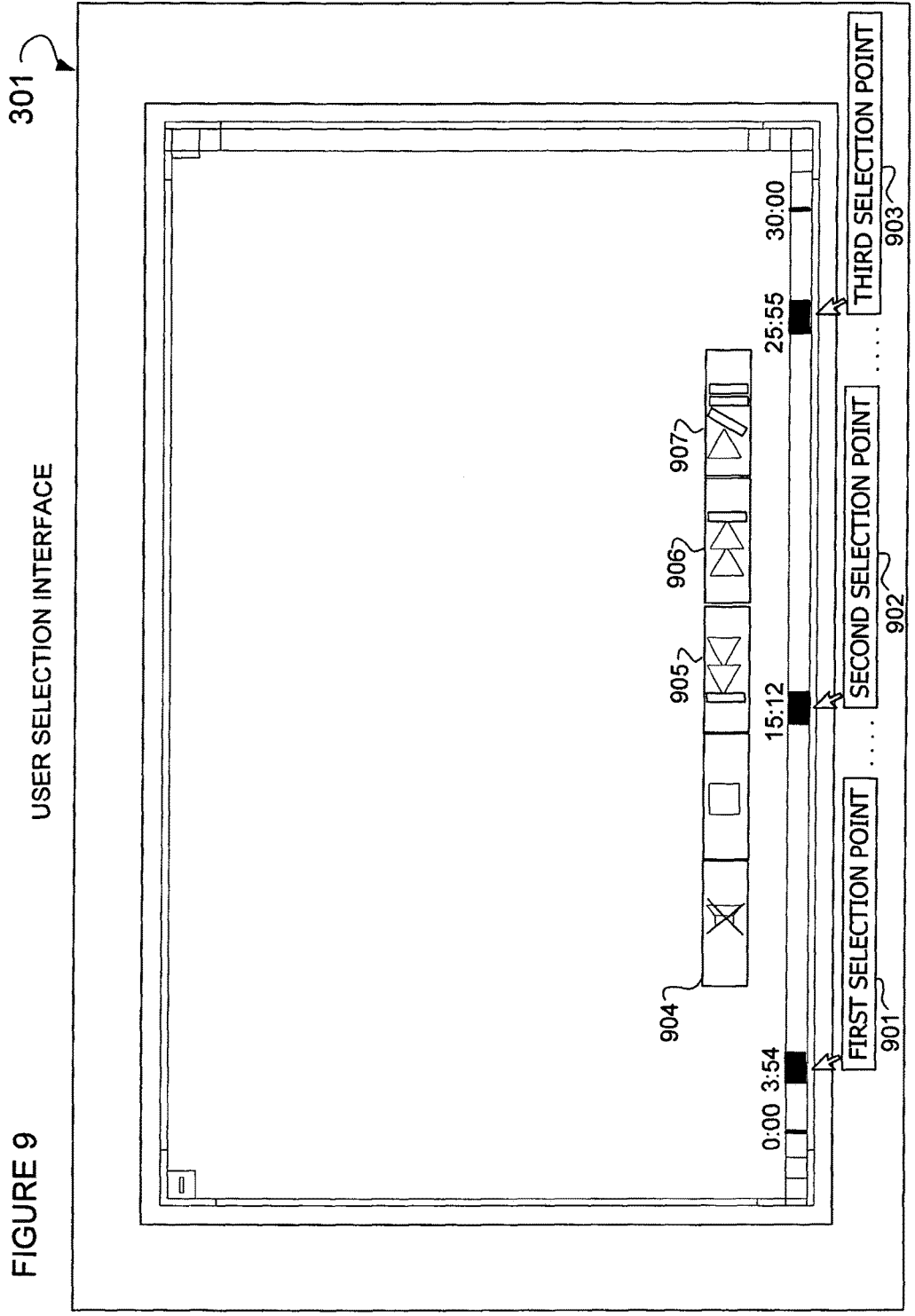
FIG. 9 is a user selection interface illustrating the various buttons, screen objects, or widgets that may be used to select or, in some cases, deselect a starting point for viewing a particular piece of digital content or otherwise generating selection data, according to an example embodiment.

FIG. 9 is an example user selection interface 301 illustrating the various buttons, screen objects, or widgets that may be used to select or, in some cases, deselect a starting point for viewing a particular piece of digital content or otherwise generating selection data. Described is a first selection point 901 (e.g., 3:54 minutes), a second selection point 902 (e.g., 15:12 minutes), and a third selection point 903 (e.g., 25:55 minutes). These various selection points (e.g., 901-903) as previously described allow a user such as, for example, user 101, to select a starting point for a particular piece of digital content and in effect allows the user 101 to generate selection data. In addition to these selection points (e.g., 901-903) a user, in some embodiments, may be able to deselect certain types of selection data. For example, using a media bar 904, a user may choose to fast-forward past certain selection points or certain pieces of digital content using, for example, a fast-forward button 906. In cases where a user chooses to use the button 906 to fast-forward past or otherwise bypass a piece of digital content, selection values associated with this particular piece of digital content may be understood to be negated or to be negative. By contrast, in instances where a button 907 is used to play a piece of digital content or a button 905, which is used to reverse back to a piece of digital content, the button 906 wherein digital content is fast-forwarded past may indicate a user, such as user 101's preference not to view a particular piece of digital content. In cases where this fast-forward button 906 is implemented, a user, such as user 101, indicating a preference to fast-forward or bypass particular piece of digital content may generate selection data which may have a negative value. For example, where a user such as user 101 decides to fast-forward past the second selection point 902, this second selection point 902 may have a negative value associated with it. This negative value may then be used to subsequently generate a graphical representation of a preference, or in this case lack of preference, for a particular piece of digital content.

Figure 10:
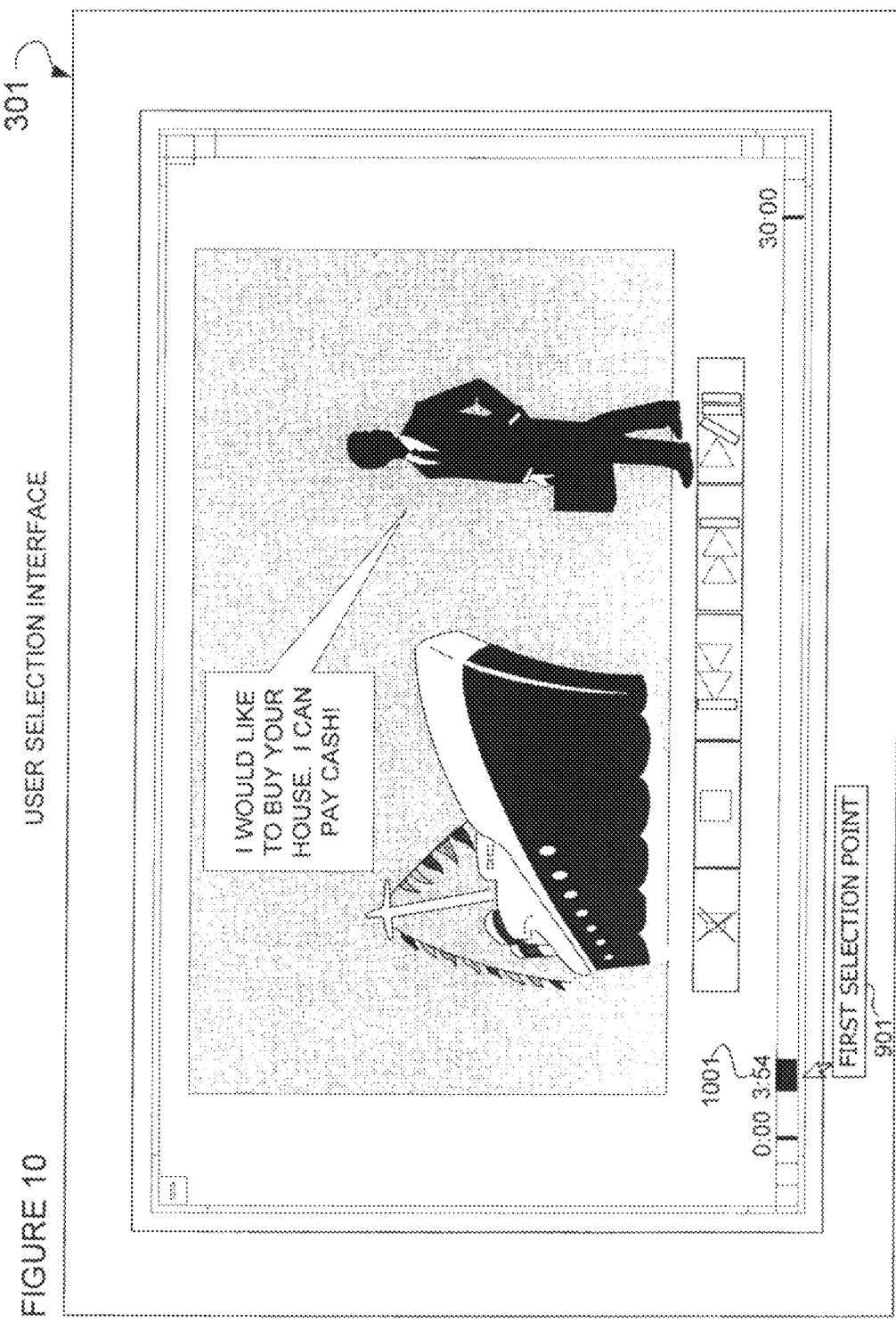
FIG. 10 is a user selection interface illustrating a start position for a video, according to an example embodiment.

FIG. 10 is an example user selection interface 301. Described is a start position 1001 where a video will begin. As previously described, where a selection point is used (e.g., 1001) a value, or in this case a positive value, will be associated with this selection point.

Figure 11:
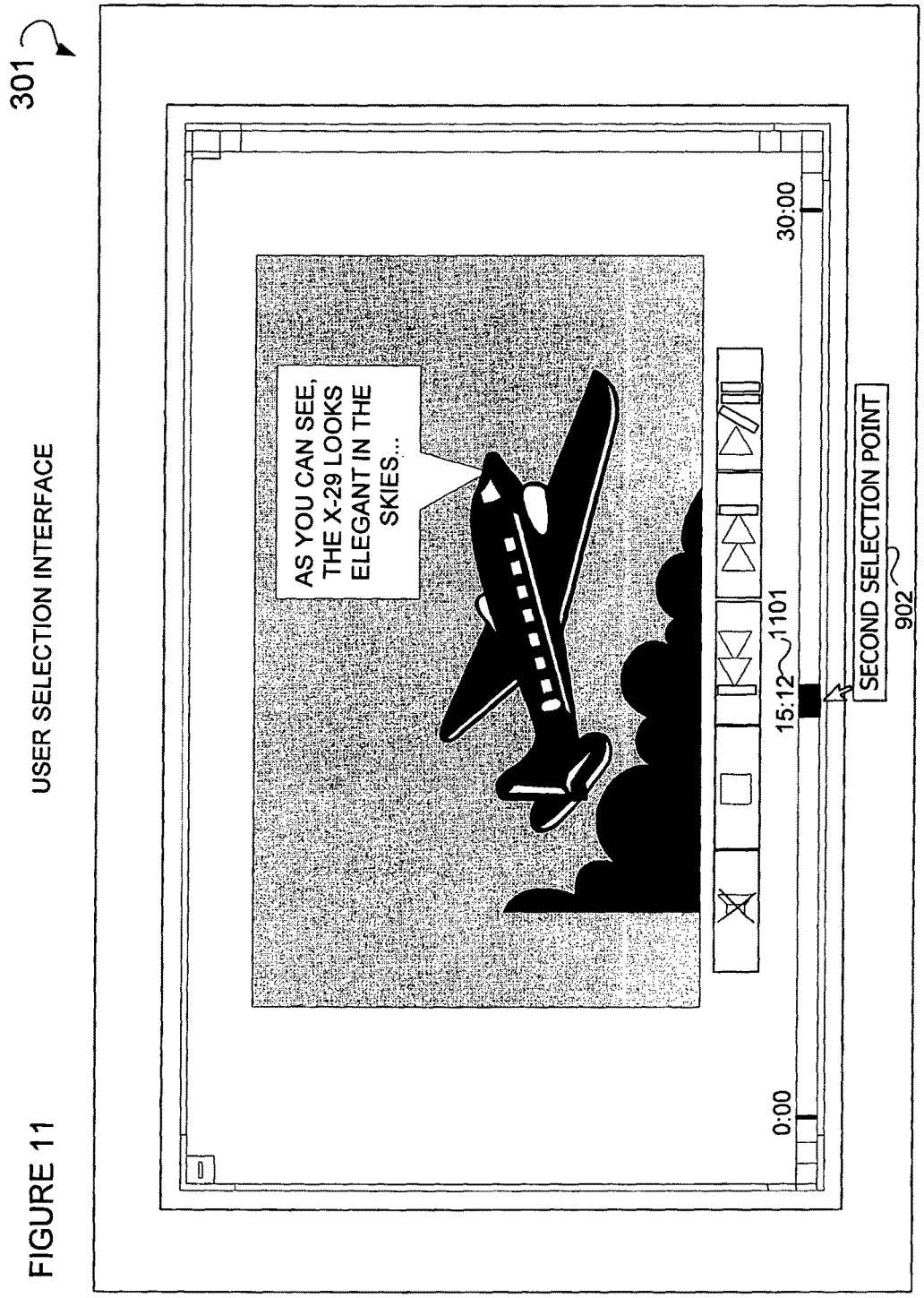
FIG. 11 is a user selection interface where a starting time of 15:12 minutes is chosen by, for example, a user, according to an example embodiment.

FIG. 11 is an example user selection interface 301 where a starting time of 15:12 minutes (e.g., 1101) is chosen by, for example, user 101. Here, as with start point 801, a positive value will be associated with this starting point 1101.

Figure 12:
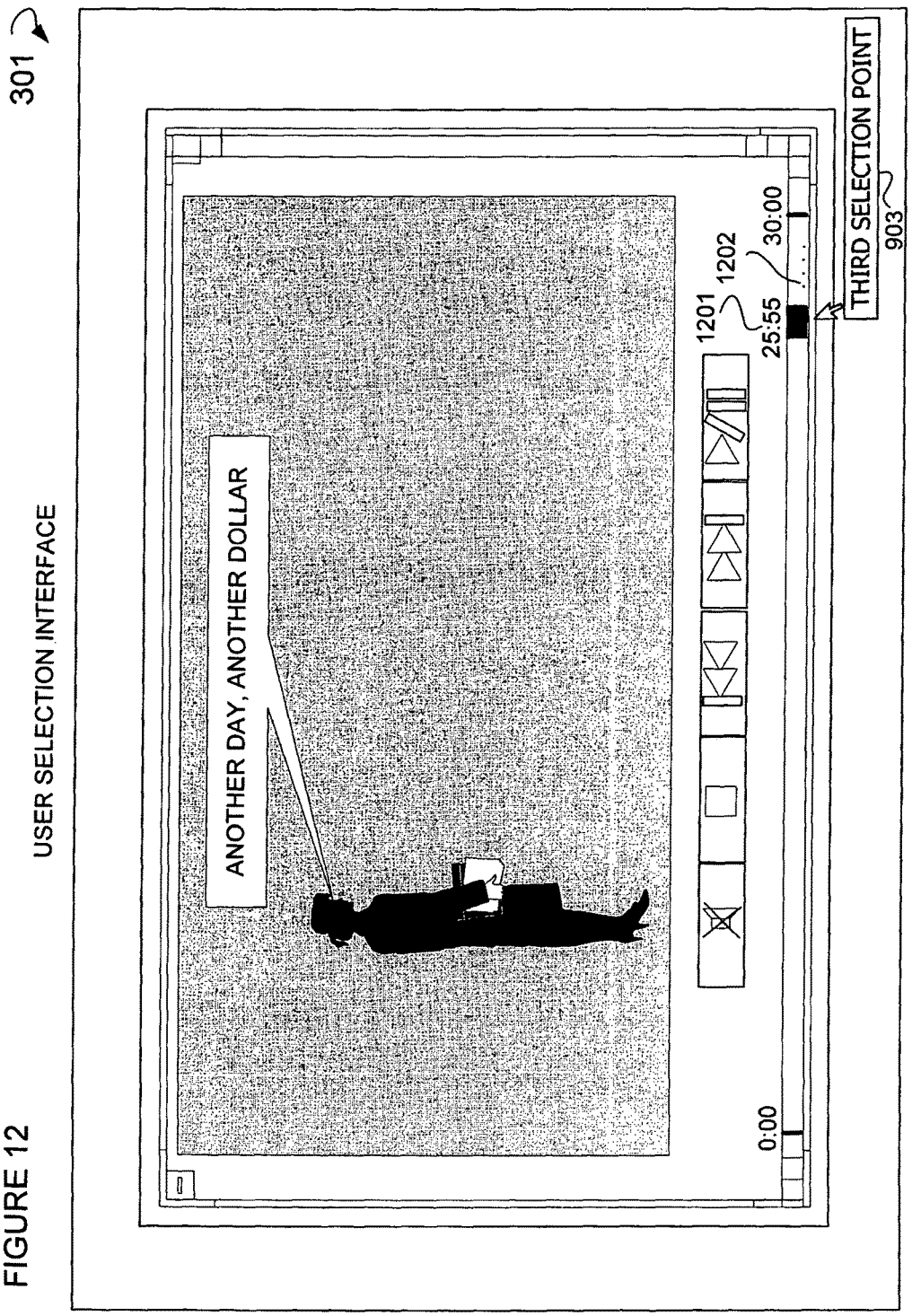
FIG. 12 is a user selection interface wherein a third selection point denoted by starting time of 25:55 is illustrated as is a series or sequence of selections, according to an example embodiment.

FIG. 12 is an example user selection interface 301 wherein a third selection point 903 denoted by starting time of 25:55 (e.g., 1201) is illustrated as is a series or sequence of selections as noted by 1202. In some embodiments, a user, such as user 101, may chose to select a series of contiguous frames using a selection point, such as the third selection point 903. More to the point, in some cases user 101 may click on the button represented by the third selection point 903 and drag it across a contiguous series of data packet values such that each one of these data packet values has a positive selection value associated with it.

Figure 13:
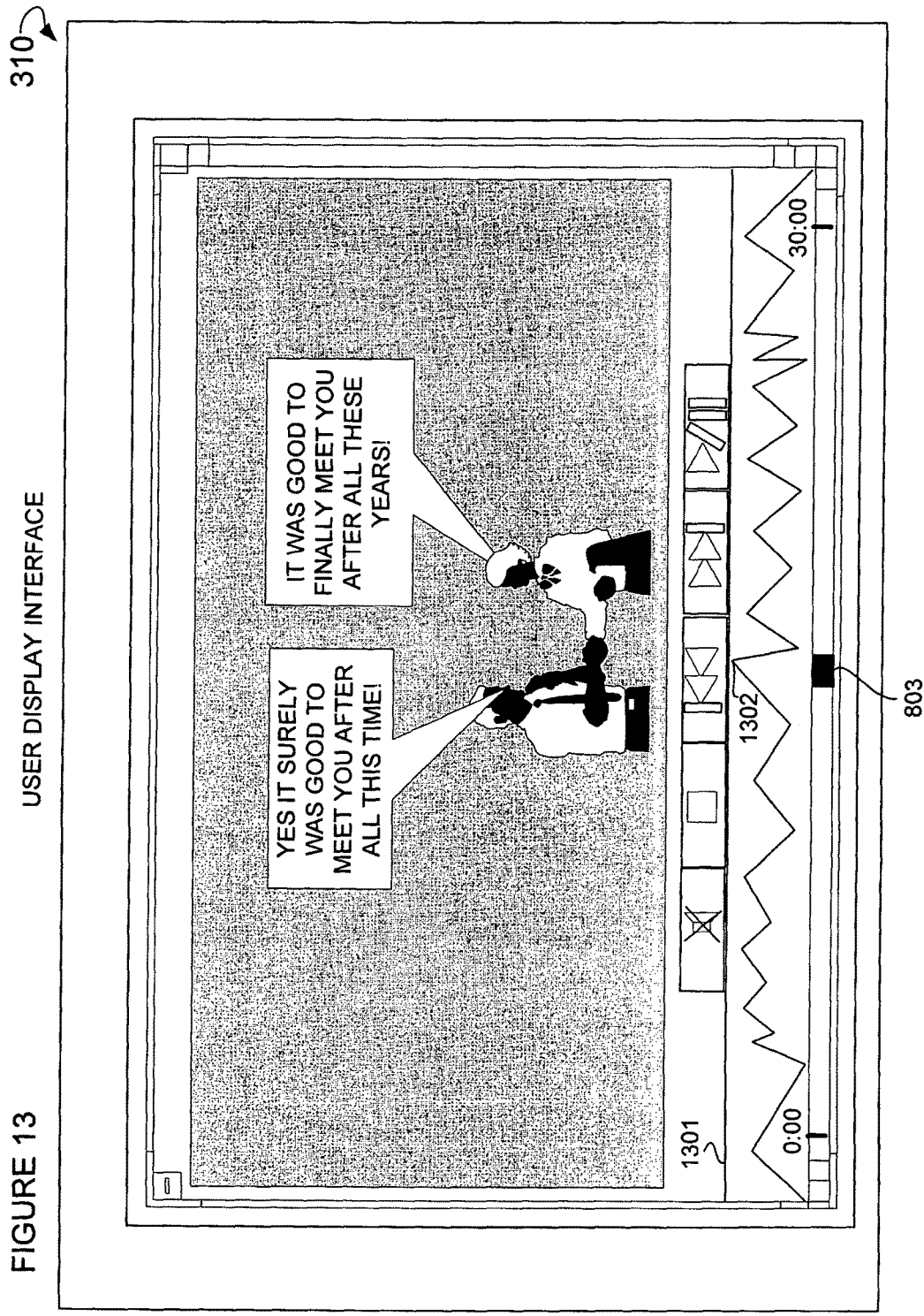
FIG. 13 is a user display interface illustrating a graphical representation of various usage data displayed as a line graph, according to an example embodiment.

FIG. 13 is an example user display interface 310 illustrating a graphical representation of various usage data displayed graphically. In some embodiments, a user display interface contains a pane 1301. Contained within this pane 1301 is a graph depicting the cumulative usage of certain types of selected data wherein this data corresponds to the number of times a user, such as user 101, has selected particular pieces of digital content for viewing, or in some cases has deselected or decided not to view certain pieces of digital content. Illustrated is a peak 1302 that represents the peak number of times that a particular piece of digital content has been viewed. In some cases, a user utilizing a scroll button, such as scroll button 803, may be able to use this scroll button to view a peak use such as 1302.

Figure 14:
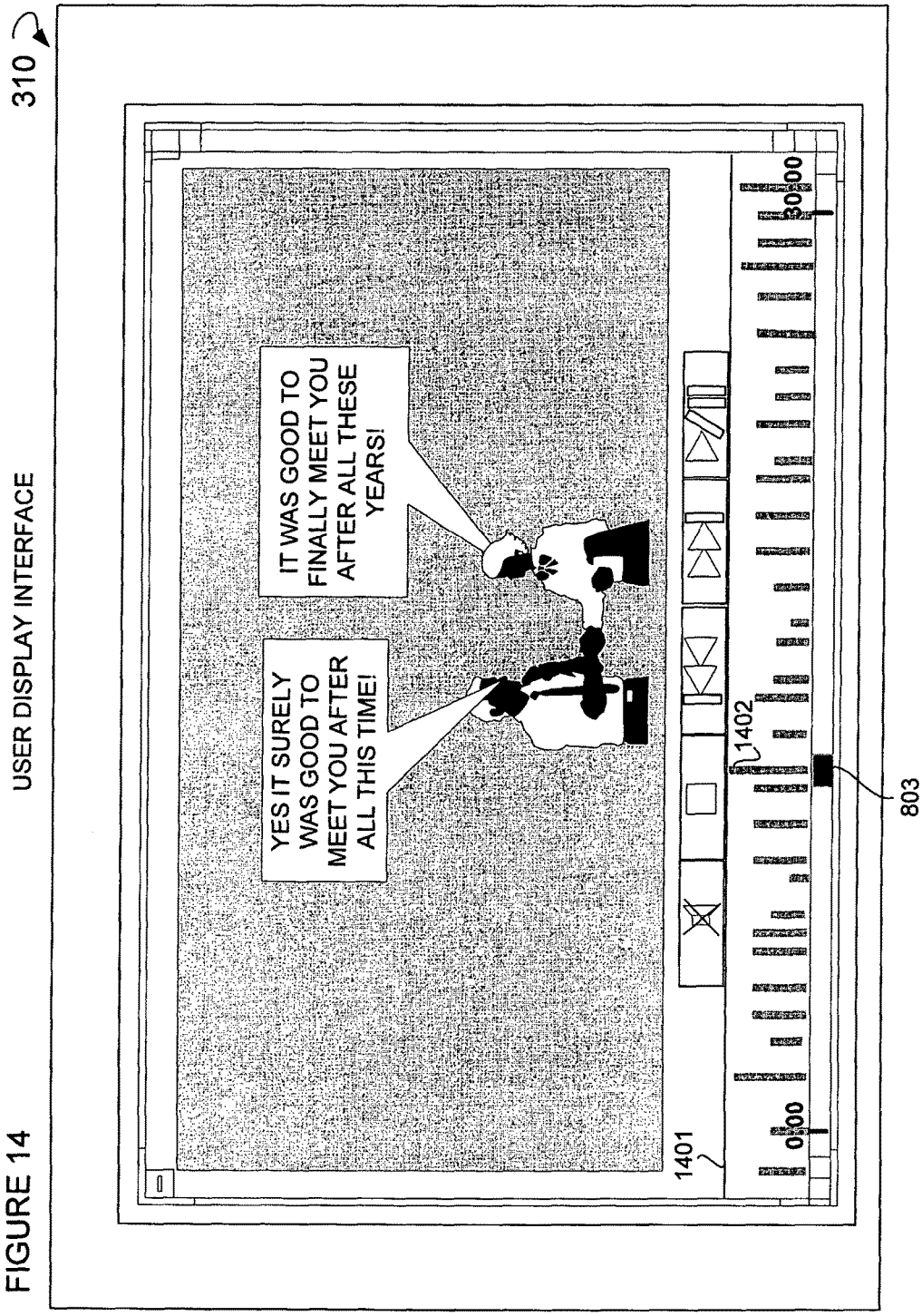
FIG. 14 is a user display interface illustrating a graphical representation of various usage data displayed as a bar graph, according to an example embodiment.

FIG. 14 is an example user display interface 310. Illustrated is a user display interface containing a pane 1401 wherein certain cumulative user data is represented graphically. A bar 1402 is illustrated that represents the maximum number of times a particular piece of usage data has been selected by a user, such as user 101. In some cases, a user, such as user 201, may select or otherwise decide to view the data associated with this maximum use value 1402 through using a scroll button or bar 803.

Figure 15:
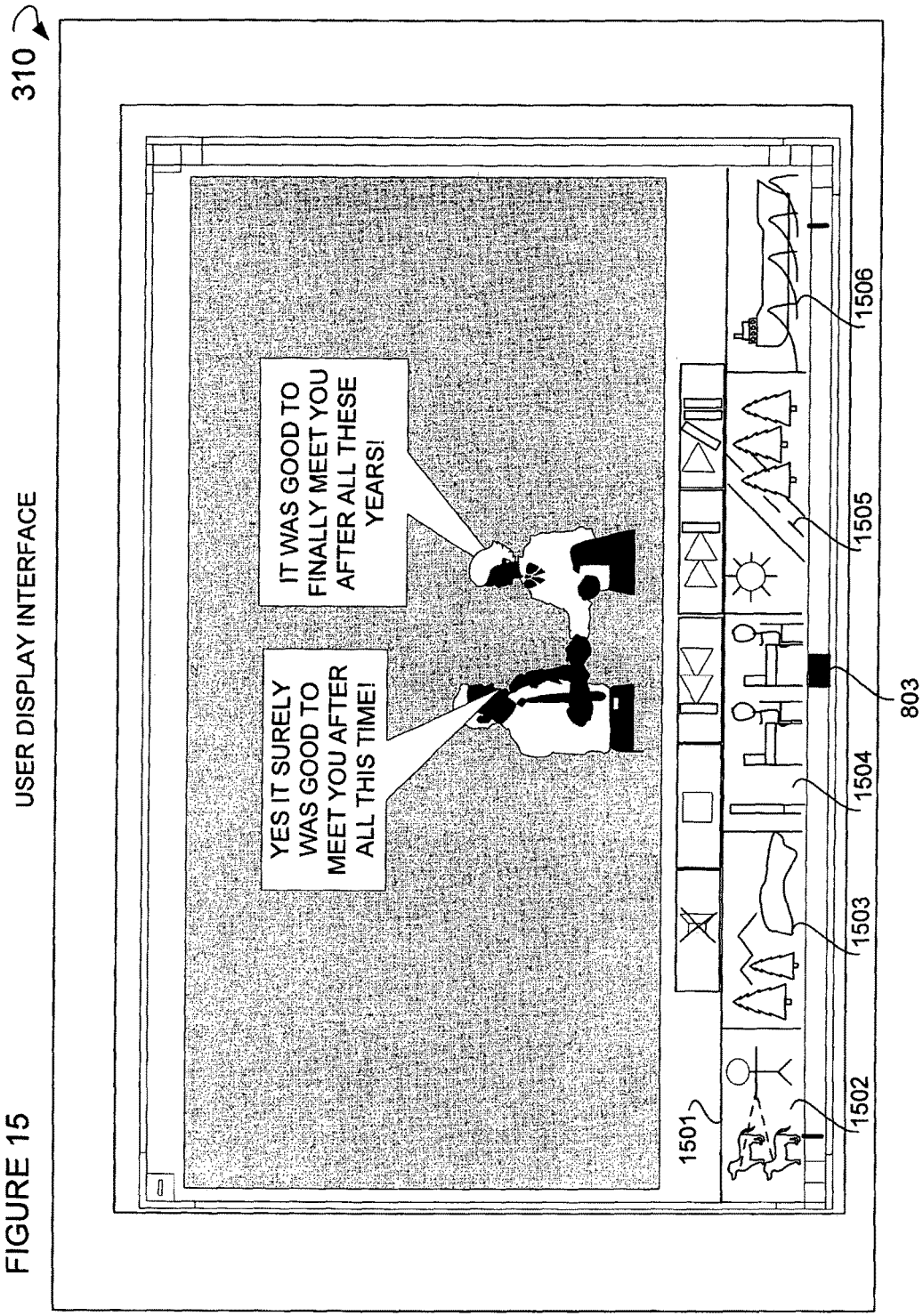
FIG. 15 is a user display interface illustrating a graphical representation of various data displayed graphically as thumbnail images, according to an example embodiment.

FIG. 15 is an example user display interface 310 illustrating a graphical representation of various data displayed graphically as thumbnail images. In some embodiments, a sub frame 1501 of the user display interface 310 contains thumbnails 1502-1506 depicting the beginning point of certain portions of video content. Example embodiments may include these portions of video content being displayed based upon the number of times they have been selected (e.g., selection data generated with respect to these portions) by a user (see e.g., FIGS. 8-12 and the discussion therein).

Further, in some embodiments, these portions of video content displayed as thumbnail images (e.g., 1502-1506) may be displayed based upon certain rating values associated with this digital content. A system and method for generating rating values and associating them with digital content to create rated digital content is described in U.S. patent application Ser. No. 11/669,002 which, as previous asserted, is incorporated by reference in its entirety. FIGS. 5 and 7, generally describe a system and method for creating and displaying this rated digital content. In cases where rated digital content is displayed as a thumbnail, the thumbnail or series of thumbnails (e.g., 1502-1506) may be displayed based upon a range of time values such that frames with a particular rating value, or range of rating values, may be displayed over the time values that they appear. For example, thumbnails 1502-1506 may represent rated digital content with a rating of 7 for a particular range of TR values where 1502 has a TR value of 23 minutes, 1503 has a TR value of 26 minutes, 1504 has a TR value of 31 minutes, 1505 has a TR value of 39 minutes, 1506 has a TR value of 41 minutes. In some embodiments, these thumbnails may be displayed in order or rating value such that the thumbnail with the highest rating is, moving left to right across the user display interface 301, displayed first, the next highest displayed second etc.

Example Algorithms

Figure 16:
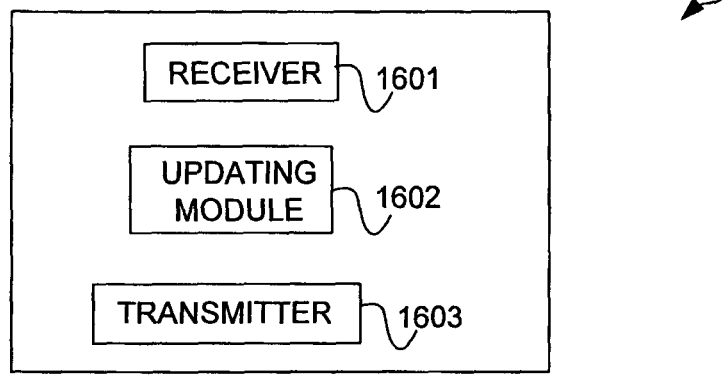
FIG. 16 is a block diagram of a media server, according to an example embodiment.

FIG. 16 is a block diagram of an example media server 110. Illustrated is a plurality of blocked (e.g., modules) that, in some embodiments, may be implemented in hardware (e.g., circuits), firmware, or even software. A receiver 1601 is illustrated that receives selection data. In one embodiment, this receiver 1601 is a network adaptor card that provides for a network interface between the media server 1600 and a network such as an Internet. Next, an updating module 1602 is described that facilitates the updating of cumulative usage data with the selection event data. Further a transmitter 1603 is described that facilitates the transmission of cumulative usage data, in some cases, as a histogram.

In some embodiments, computer system is illustrated as including a receiver (e.g., receiver 1601) to receive selection event data to update cumulative usage data, the cumulative usage data relating to a number of times a user has accessed a particular portion of digital content, and an updating module (e.g., an updating module 1602) to update the cumulative usage data with the selection event data. Further, the selection event data may indicate a user selection event with respect to the particular portion of the digital content, and the cumulative usage data indicates a count of user selection events with respect to the particular portion of the digital content. Additionally, the selection event data may identify the digital content and the particular portion of the digital content accessed by the user. Moreover, the digital content may be video content, and the selection event data identifies a frame of the video content selected by the user. Further, the computer system may include a transmitter to transmit the cumulative usage data as a histogram.

Figure 17:
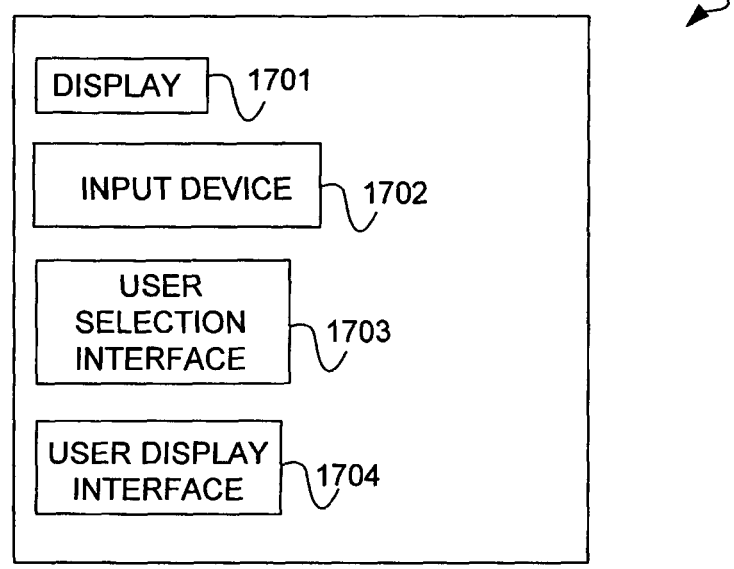
FIG. 17 is a block diagram of an example device, according to an example embodiment.

FIG. 17 is a block diagram of an example device 102. Illustrated is a plurality of blocked (e.g., modules) that, in some embodiments, may be implemented in hardware (e.g., circuits), firmware, or even software. A display 1701 is illustrated that allows for the display of the cumulative usage data (e.g., the histograms) in a graphical format. This display may be a monitor or other display device. Further, an input device 1702 is also illustrated that allows a user to make selections from a user selection interface 301, or a user display interface 310. This input device 1702 may be a mouse, light pen, track ball, or other suitable input device. Further, a user selection interface 1703, and a user display interface 1704 is also illustrated. These two interfaces have functionality similar to that of user selection interface 301, and user display interface 310.

Example embodiments may include a computer system having a display (e.g., a display 1701) to display cumulative usage data in a graphical format, the cumulative usage data being indicative of an amount of user access to digital content, and an input device (e.g., input device 1702) to receive a selection of a portion of the cumulative usage data, as displayed in a graphical format, that corresponds to a portion of the digital content, the display further to display the portion of the digital content. Further, the cumulative usage data may represent a sum of selected event data generated by a plurality of users. Additionally, the computer system may include a user selection interface (e.g., user selection interface 1703), the user selection interface allowing a user to generate selection event data. Moreover, the computer system may include a user display interface (e.g., user display interface 1704), the user display interface allowing a user to display the cumulative usage data.

Figure 18:
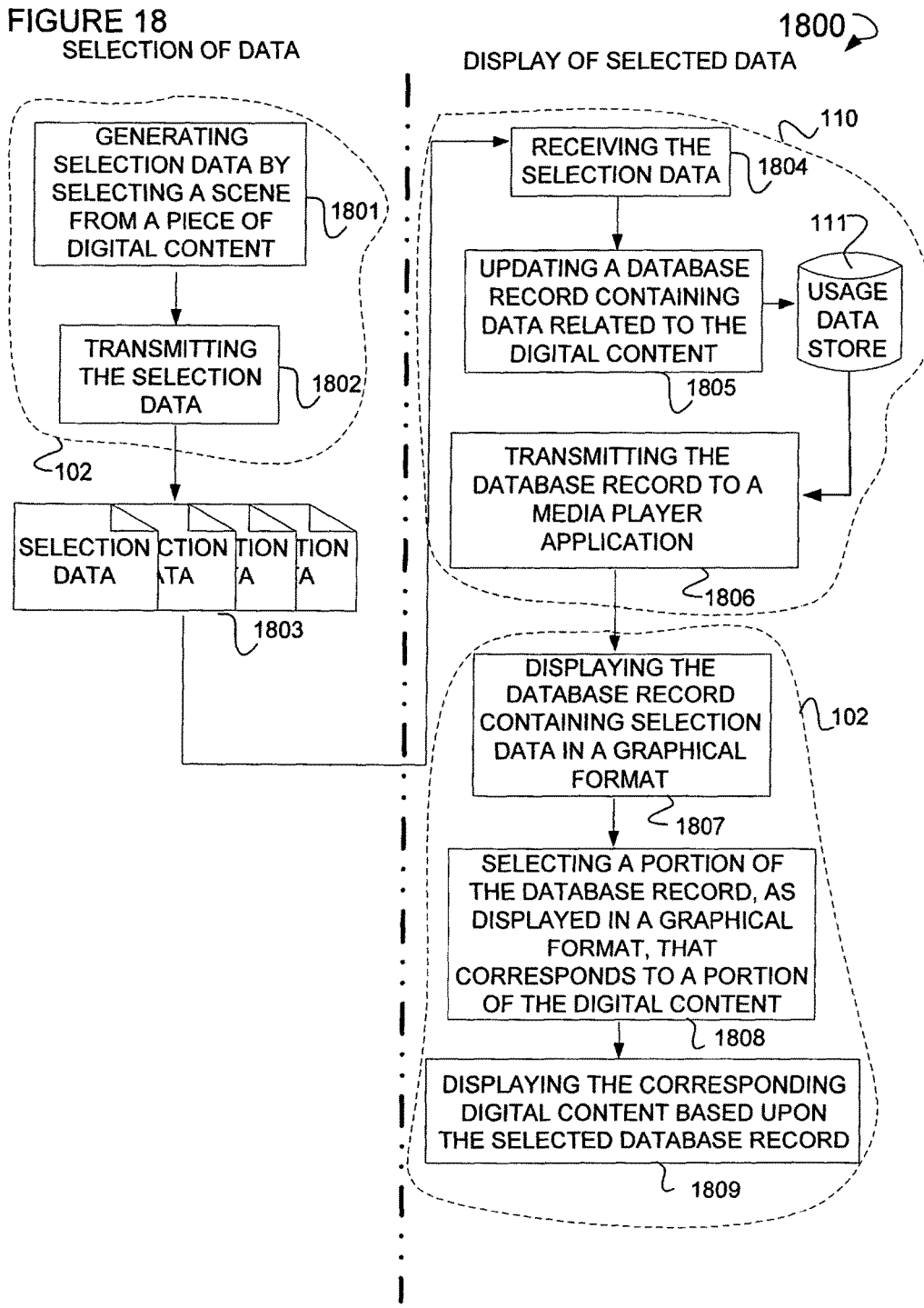
FIG. 18 is a dual stream flow chart describing an example method to select and display data, according to an example embodiment.

FIG. 18 is a dual stream flow chart describing an example method 1800. Illustrated is a first stream titled "Selection of Data" and a second stream titled "Display of Selected Data." With regard to the first stream, various operations 1801 and 1802 are described as residing on one or more of the devices 102. With regard to the module 1801 by implementing this module, selection data is generated by selecting a scene from a particular piece of digital content. As previously described, this selection process may involve the utilization of various screen objects or widgets, such as toolbars, a mouse, or some other selection object or method. Once a piece of selection data is generated using the module 1801, this selection data is transmitted by a module 1802. This selection data is collectively described herein via 1803, and once generated this selection data 1803 is transmitted to a variety of operations (e.g., 1804-1806) residing on, for example, a media server 110. Once this selection data 1803 is received by the media server 110 using a module 1804, a module 1805 is executed that updates a database containing usage data relating to a particular piece of digital content wherein this digital content is stored on a usage data store database 111. In some embodiments, this usage data may be updated by incrementing certain values associated with certain usage values associated with a particular frame of a particular piece of digital content. While in other embodiments this updating may take the form of decrementing certain usage values associated with a particular piece of digital content. In some cases a user, such as user 201, may make a content selection request (e.g., 202) of the media server 110. Such requests are processed by a module 1806 that retrieves the requested content in associated usage data from the usage data store database 111 and transmits it to the requesting user (e.g., 201) and the associated device or devices 102 that they may use to make this request. In some cases, various operations (e.g., 1807-1809) are used by the one or more devices 102 to retrieve usage data in associated digital content. For example, a module 1807 may display the database record retrieved and transmitted by the module 1806 in a graphical format (see e.g., 307). Once the module 1807, is executed, a subsequent module 1808 is executed that allows a user, such as user 201, to select a portion of this graphically displayed database record such that they will be able to select the portion of the graph corresponding to particular piece of digital content and will be able to initiate viewing of the particular piece of digital content based upon the selection of the portion of the graph. Put another way, in some embodiments a mapping occurs between the values contained on the graph and graphical representation and the digital content. As will be more fully described below, this mapping may use a lookup table or other suitable data structure. Once the module 1808 is executed, a module 1809 is executed that actually displays the digital content corresponding to the selected portion of the graph. These various operations (e.g., 1804-1809) make up the second stream of this dual stream flow chart (e.g., titled "Display of Selected Data").

Some embodiments may include a computer system comprising a receiver (e.g., module 1804) to receive selection data, the selection data relating to a number of times a user has viewed a particular portion of digital content, and an updating module (e.g., 1805) to update selection data contained in a database record relating to digital content, the database record containing a sum of selection data. Further, the computer system may have a transmitter (e.g., module 1806) to transmit a cumulative usage data representation (e.g., 204), the cumulative usage data representation placed into a media stream. This cumulative usage data 204 may be a metadata file, or even may be inserted into a data packet.

Example embodiments may include a computer system comprising a display (e.g., module 1807) to display a database record containing selection data in a graphical format, an input device to select a portion of a database record, as displayed in a graphical format, that corresponds to a portion of digital content, and displaying the portion of digital content (see e.g., operations 1808 and 1809). Further, an input device (e.g., a mouse, light pen or other suitable input device) may be operatively coupled to the computer system used to generate selection data. Additionally, the computer system may have a user selection interface (e.g., 301 and 501), and/or a user display interface (e.g., 310, and 510).

Figure 19:
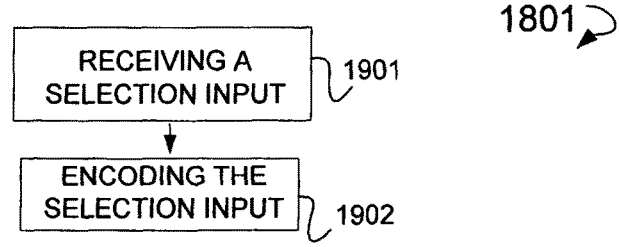
FIG. 19 is a flow chart illustrating a method used to receive a selection input and encode this input, according to an example embodiment.

FIG. 19 is a flow chart illustrating an example method used to implement module 1801. Illustrated is an operation 1901 that receives a selection input. As previously described this selection input may be in a form of a user 101 using various screen objects or widgets to generate selection data relating to their usage of a particular piece of digital content. Once the operation 1901 is executed, an operation 1902 is executed that actually encodes the selected input. In some embodiments, this encoding process may use various types of formats that are known in the art. These formats may include a Session Initiation Protocol (SIP) using a junction with a Session Description Protocol (SDP) that in turn uses protocols including a Transmission Control Protocol (TCP), a User Datagram Protocol (UDP), and an Internet Protocol (IP) such as Internet protocol version 4 or Internet protocol version 6. In some cases the session description protocol may be used to encode and transmit the previously described selection data and, more to the point, the values or mapping correspondence between the actual selected data and the frame number of each of the pieces of selected data.

Figure 20:
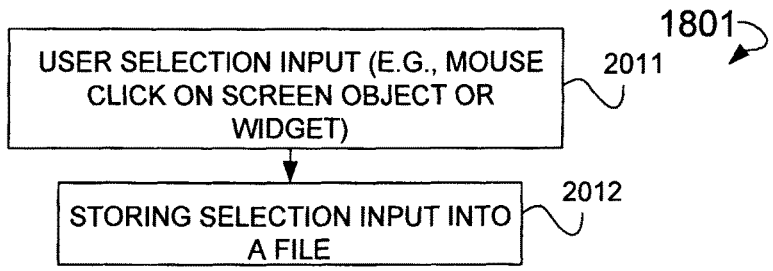
FIG. 20 is a flow chart illustrating a method to implement a module to update a database containing usage data relating to a particular piece of digital content, according to an example embodiment.

FIG. 20 is a flow chart illustrating an example method to implement module 1801. Described is an operation 2011 wherein a user generates selection data (e.g., 107) through the use of some type of input such as a mouse click or a screen object or widget that is activated through, for example, a mouse click. Once this operation 2011 is executed, an operation 2012 is executed wherein the selection data is stored as a file. In some embodiments, an aggregation of various portions of various selection data are stored as a single file that is ultimately transmitted across a network 108 to a media server 110 for storage in a user data store or database 111. This aggregation selection data is reflected in, for example, selection data 302-305, 401-404 and 501-504.

Figure 21:
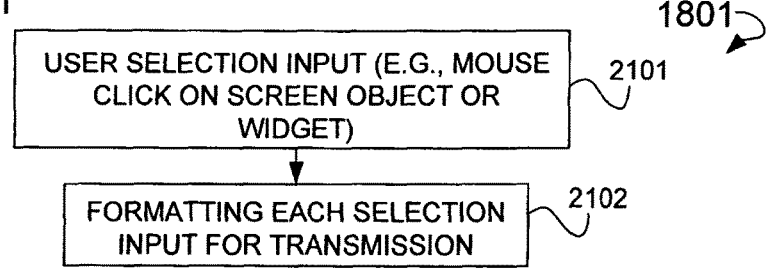
FIG. 21 is a flow chart illustrating a method to implement a module to retrieve requested content and associated usage data from the usage data store database and transmits this data to a requesting user, according to an example embodiment.

FIG. 21 is a flow chart illustrating an example method used to implement a module 1801. Described is an operation 2101 wherein a user may generate selection data (e.g., 107) using a mouse to activate a screen object or widget. Once module 2101 is implemented, an operation 2102 is executed that formats each selection input for transmission. In contrast to the example where a variety of selection data such as, for example, 302-305, are combined into a single file for transmission across the network 108. In this example, individual pieces of selection data (e.g., 302, 303, 304, 305) are transmitted across a network 108. The various protocols associated with the transmission of a file containing aggregated selection data as opposed to individual packets of individual non-aggregated examples of selection data are well known in the art.

Figure 22:
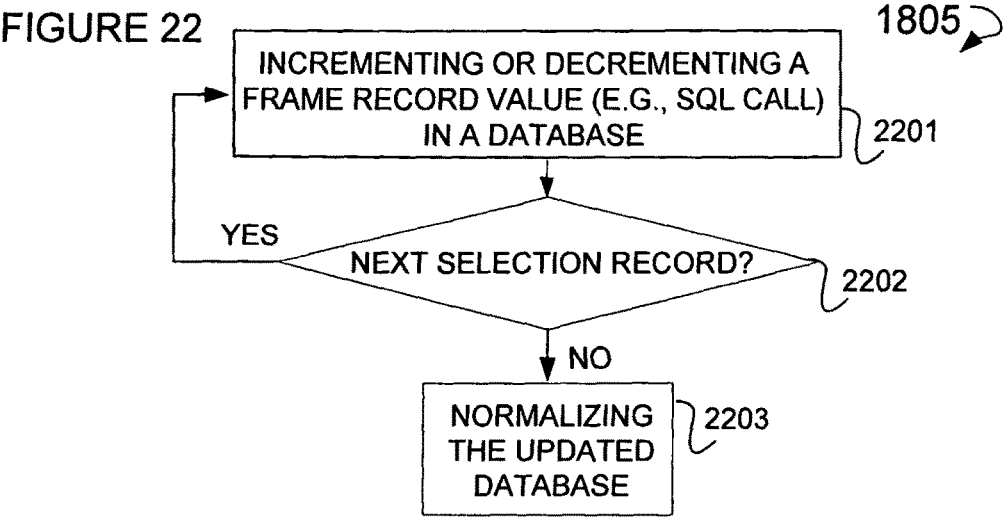
FIG. 22 is a flow chart describing a method to implement a module to display a retrieved database record graphically, according to an example embodiment.

FIG. 22 is a flow chart illustrating an example method to implement module 1805. Described is an operation 2201 that may increment or decrement a frame record value in a database. In some cases this incrementing or decrementing may be accomplished using, for example, a Structured Query Language (SQL) call to insert a new value into a database such as database 111. Once this operation 2201 is executed, a decisional operation 2202 is executed that determines whether a second selection data value has been provided. Where the decisional operation 2202 evaluates to "yes," then the operation 2201 is executed and a subsequent frame record value is incremented or decremented and the values in the database updated. Where the decisional operation 2202 evaluates to "no," an operation 2203 is executed that normalizes the updated database. Process for normalization is described below.

Figure 23:
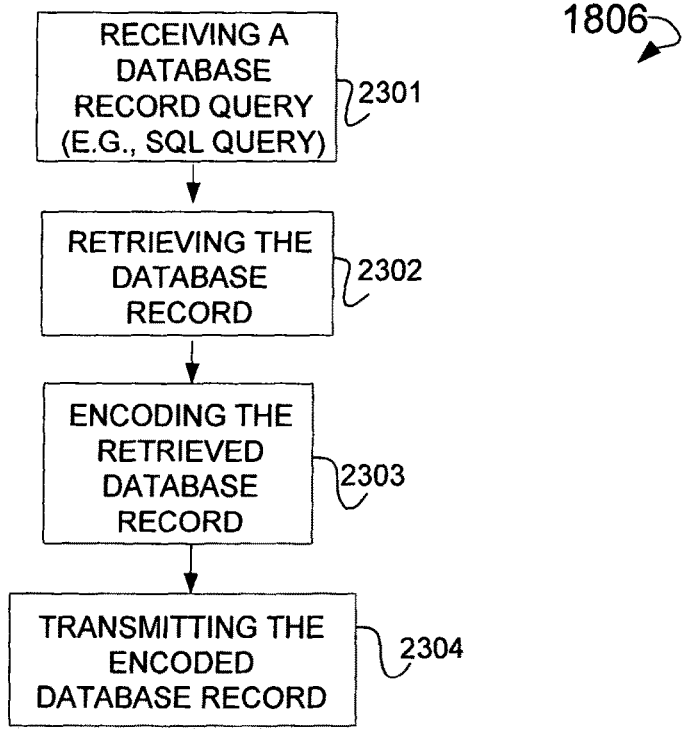
FIG. 23 is a flow chart describing a method used to implement a module to select a portion of a graphically displayed database record, according to an example embodiment.

FIG. 23 is a flow chart illustrating an example method to implement module 1806. Described is an operation 2301 that receives a database record query. In some embodiments, this query will be in the form of an SQL query. Once this database record query is received, operation 2302 is executed that actually retrieves the database record. This process of retrieving the database record may again be implemented utilizing SQL and various SQL methods such as select. Once the operation 2302 is executed, an operation 2303 is executed to encode the database record. This process for encoding may include the utilization of various types of encoding protocols well known in the art, including but not limited to the aforementioned TCP/IP, UDP/IP, and the usage of, for example, SIP and/or SDP. Once the operation 2303 is executed and the database record encoded, an operation 2304 is executed that actually transmits the encoded database record. This transmission, as previously described, may be across, for example, a network 108, when the network 108 is the Internet, a Wide Area Network (WAN), a Local Area Network (LAN), or some other suitable network.

Figure 24:
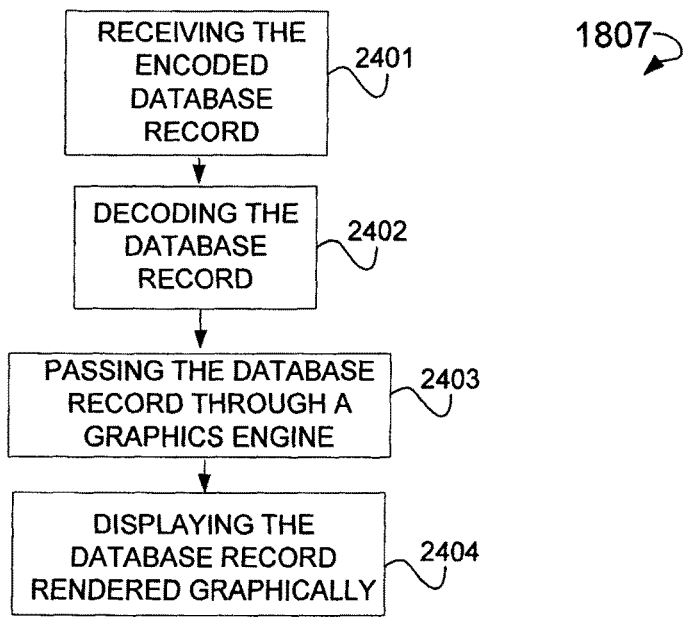
FIG. 24 is a flow chart illustrating a method to implement a module to generate a user selection and store this selection into a file, according to an example embodiment.

FIG. 24 is a flow chart describing an example method to implement module 1807. Illustrated is an operation 2401 that receives an encoded database record. In some cases, this operation 2401 may be a network connection interface and/or a socket programming interface, as is known in the art. Once this operation 2401 is executed, an operation 2402 is executed that decodes the database record. After the decoding of the database record, an operation 2403 is executed that passes the database record through a graphics engine. Once passed through the graphics engine, an operation 2404 is executed to display the database record rendered graphically (see, e.g., 1101 and/or 1201).

Figure 25:
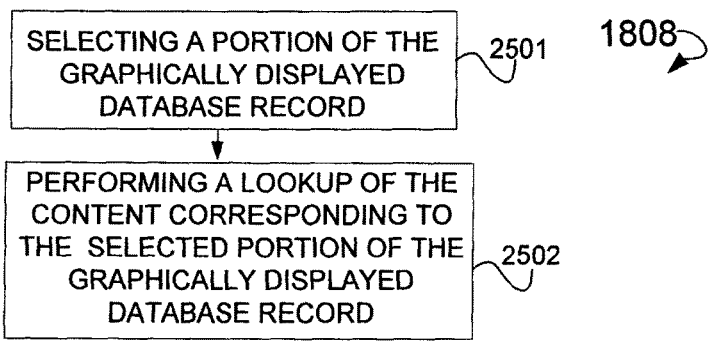
FIG. 25 is a flow chart illustrating a method used to implement a module to generate a user selection and format this selection for transmission across a network, according to an example embodiment.

FIG. 25 is a flow chart describing an example method used to implement module 1808. Illustrated is an operation 2501 wherein a user is provided with the ability to select a portion of a graphically displayed database record. This selection may be by way of using a mouse to select a screen object or a widget as the screen object or a widget exists as a part of a database record rendered graphically. Once a portion of this graphically displayed record is selected, a lookup table or other suitable data structure is used to look up the digital content corresponding to the selected portion of the graphically displayed record (see e.g., operation 2502). Once the corresponding or mapped portion of the digital content is found, it is retrieved and played for the user, such as user 201. This process for looking up and playing will be more fully described below.

In some embodiments, a data structure (e.g., an array, list, stack queue, hash table, or radix tree) is generated to serve as a lookup table into which is stored the range of values described in, for example, fields 611, 613, and 615, and fields 711, 713, and 715. With regard to the TR values stored in fields 612, 614, and 616, once a user selects a piece of graphically represented selection data, a lookup of the TR value corresponding to that selection data may be conducted. Where a matching value is found in the lookup table, the media stream or digital content file is pulled from the web server 109 or media server 110 for playing. In some embodiments, this digital content may already be buffered for play on one of the devices 102. The following is an example lookup table, where the values on the left hand column represent frame number values, and the values of the left represent the number of times each frame has been selected:

| 7 | 8 |
|---|---|
| 8 | 15 |
| 9 | 20 |
| 18 | 43 |

Some embodiments may include a data structure that allows for an amortized constant time lookup (e.g., O(1)) such as a hash table, or near constant time lookup (e.g., O(lgn)) such as radix tree, or other suitable data structure. In some cases, the TR values in the lookup table will be stored sequentially (e.g., using a list or array) such that a true constant time lookup is possible.

Figure 26:
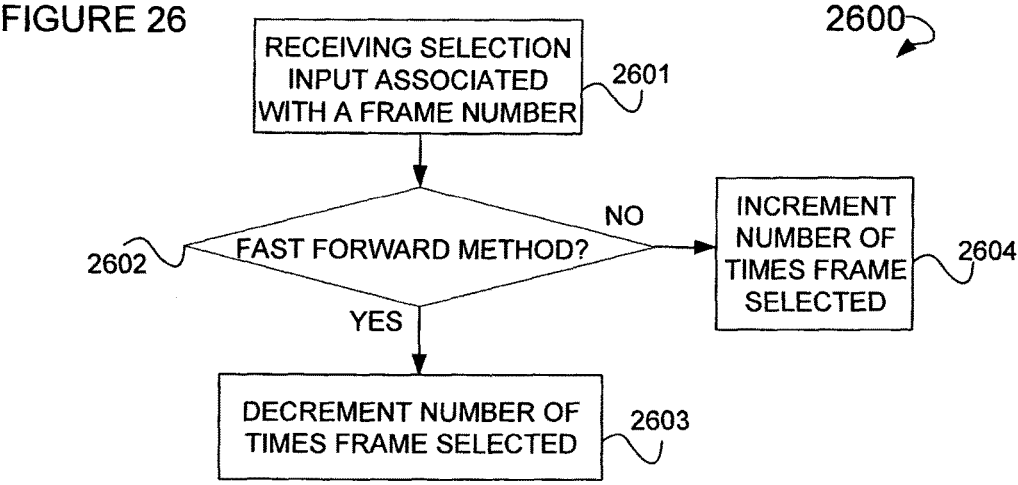
FIG. 26 is a flowchart illustrating a method to determine whether a user selection was generated with a fast-forward method, according to an example embodiment.

FIG. 26 is a flowchart illustrating the example method 2600. Illustrated is an operation 2601 that receives selection input associated with a particular frame number. Once this selection input is received, a decisional operation 2602 is executed to determine whether or not the selection input was generated using, for example, a fast-forward method. Where decisional operation 2602 evaluates to "no", an operation 2604 is executed that increments the number of times a frame has been selected and, once incremented, this value is converted into, for example, selection data. By contrast, where decisional module 2602 evaluates to "yes", an operation 2603 is executed that decrement and generates a negative value associated with the number of times a frame has been selected. This negative value is then converted into selection data and transmitted across the network, such as network 108.

Example embodiments may include a method comprising receiving selection data, the selection data relating to a number of times a user has viewed a particular portion of digital content, and updating selection data contained in a database record relating to digital content, the database record containing a sum of selection data. (See e.g., FIGS. 26-27) This method may further include transmitting a cumulative usage data representation, the cumulative usage data representation placed into a media stream, wherein the cumulative usage data is a metadata file, or the cumulative usage data representation is inserted into a data packet. (See e.g., FIGS. 3-7)

Some embodiments may include a method comprising displaying a database record containing selection data in a graphical format, and selecting a portion of a database record (see e.g., FIGS. 13-15), as displayed in a graphical format, that corresponds to a portion of digital content, and displaying the portion of digital content. Additionally, the method may further comprise generating selection data. (See FIGS. 19-21) Moreover, the method may further comprise generating a user selection interface. (See e.g., FIGS. 8-12), and a user display interface (see e.g., operation 1809).

Figure 27:
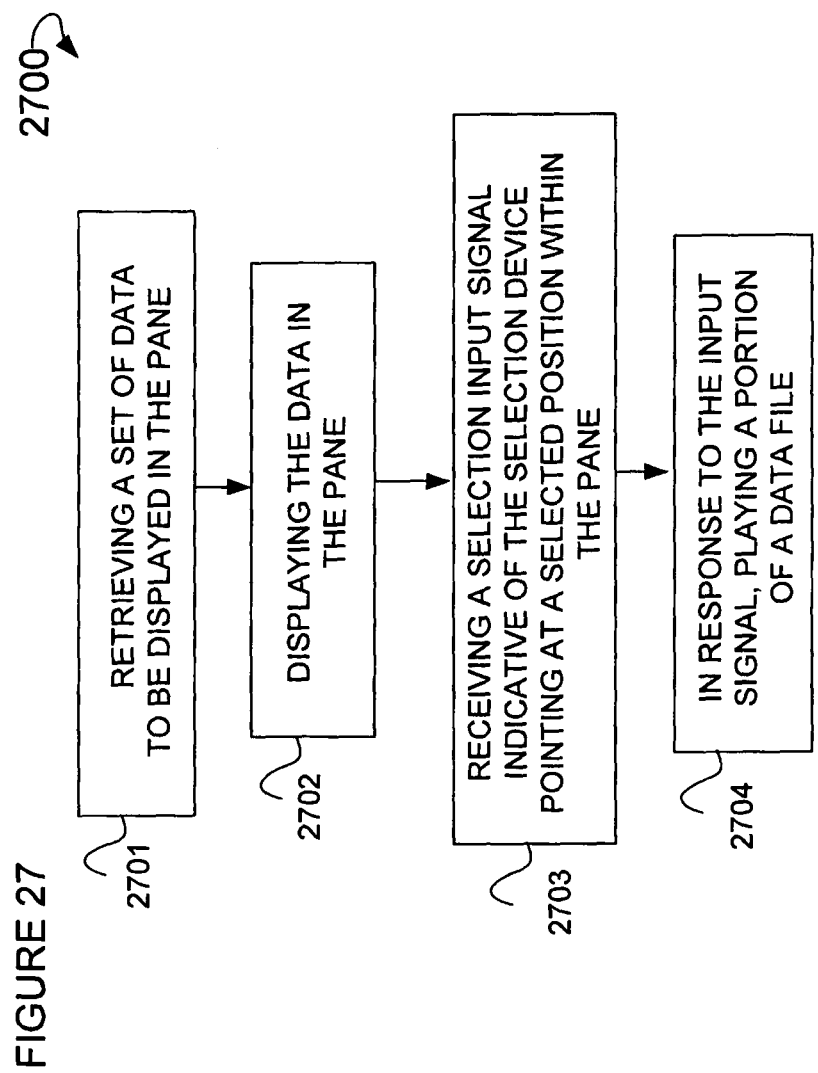
FIG. 27 is a flow chart used to depict a method used to generate a GUI and selection data in that GUI, according to an example embodiment.

FIG. 27 is a flow chart used to depict an example method 2700 used to generate a GUI and select data from that GUI. Illustrated is an operation 2701 to retrieve a set of data to be displayed in a pane. Once retrieved, an operation 2702 is executed to display the data in a pane. Next, an operation 2703 is executed to receive a selection input signal indicative of a selection device (e.g., an input device such as a mouse, light pen or other suitable device) pointing at a selected position within the pane. Then, an operation 2704 is executed that plays a portion of a data file (e.g., a digital content file or rated digital content file).

Some embodiments may include a computer system having a GUI including a display and a selection device (see e.g., FIGS. 8-15), a method of providing and selecting from a pane on the display, the method including retrieving a set of data to be displayed in the pane (see operation 2701), displaying the data in the pane (see operation 2802), receiving a selection input signal indicative of the selection device pointing at a selected position within the pane, and in response to the input signal (see operation 2803), playing a portion of a data file (see operation 2804). Further, the data may be selected form the group of data consisting of rating data, and cumulative user data. Additionally, data may be displayed in a graphical format selected from a group of graphical format types consisting of thumbnail images, bar graphs, and line graphs. This computer system may be any one of the devices 102, or even a media server 110 or web server 109.

Example Database

FIG. 28 is a diagram describing an example addition of various tuple values contained in a database 111. Illustrated is a table 2801 containing various tuple values and a table 2802 containing further table values. In some cases a number of times a frame is selected column contains various tuple entries that may be binary or decimal in nature. These entries, in some cases, may be added together to yield a total number of times a frame is selected value wherein this total number of times a frame is selected value is mapped to a particular frame number and ultimately stored in a usage data store or database 111. Here values contained in tables 2801 and 2802 are added together and stored into a table 2803. While the values reflected herein are positive values, hence incrementing values associated with a particular frame number, in some embodiments these values may be negative, hence decrementing the values associated with a particular frame number. The determination of whether a value should be incremented or decremented may be based upon the manner or method by which the selection data, such as selection data 107, is generated (see e.g., FIG. 21).

FIG. 29 is an RDS 2900 illustrating certain database tables associated with the database 111. Illustrated is a table 2901 titled "Name of Digital Content" that contains, for example, the name of a particular piece of digital content stored using a string, or other suitable data type. Also described is a table 2902 titled "Number of Times Viewed" that contains data relating to the number of times a particular frame has been viewed by, for example, a user 101. In some cases, this process of viewing by user 101 can be understood to be akin to the generation of selection data 107. This data contained in the table 2902 may be in the form of some type of numeric data type, such as an integer double flow, or other suitable data type. These tables 2901 and 2902 may be constrained by a table 2903 that contains an actual frame number which, in some cases, may be a TR value in the form of an integer data type. This frame number value may be some type of numeric data type, such as an integer flow or other suitable data type and may be a value that is 10 bits or longer in length or a corresponding decimal representation of a 10 bit number.

A Computer System

Figure 30:
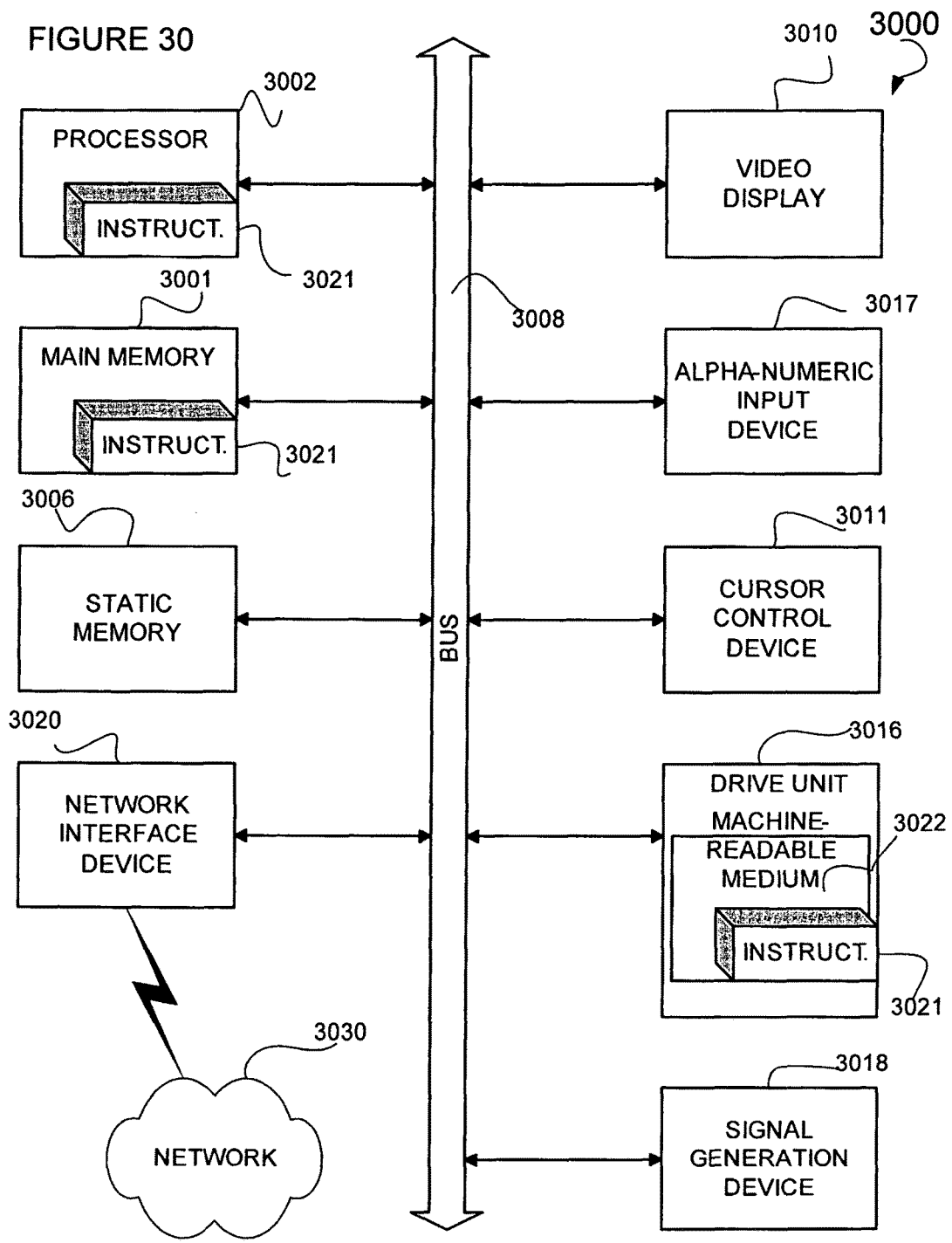
FIG. 30 shows a diagrammatic representation of a machine in the example form of a computer system that executes a set of instructions to perform any one or more of the methodologies discussed herein.

FIG. 30 shows a diagrammatic representation of a machine in the example form of a computer system 3000 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hard-wired, wireless, or a combination of hardwired and wireless connections) through a network, both perform tasks such as those illustrated in the above description.

The example computer system 3000 includes a processor 3002 (e.g., a Central Processing Unit (CPU), a Graphics Processing Unit (GPU) or both), a main memory 3001, and a static memory 3006, which communicate with each other via a bus 3008. The computer system 3000 may further include a video display unit 3010 (e.g., a Liquid Crystal Display (LCD) or a Cathode Ray Tube (CRT)). The computer system 3000 also includes an alphanumeric input device 3017 (e.g., a keyboard), a User Interface (UI) cursor controller 3011 (e.g., a mouse), a disk drive unit 3016, a signal generation device 3018 (e.g., a speaker) and a network interface device (e.g., a transmitter) 3020.

The drive unit 3016 includes a machine-readable medium 3022 on which is stored one or more sets of instructions and data structures (e.g., software) embodying or used by any one or more of the methodologies or functions described herein. The software may also reside, completely or at least partially, within the main memory 3001 and/or within the processor 3002 during execution thereof by the computer system 3000, the main memory 3001 and the processor 3002 also constituting machine-readable media.

The instructions 3021 may further be transmitted or received over a network 3030 via the network interface device 3020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies described herein. The term "machine-readable medium" shall accordingly be taken to include, but not be limited to, solid-state memories, optical and magnetic medium, and carrier wave signals.

Marketplace Applications

In some embodiments, persons reviewing digital content may want to inform other viewers of this digital content as to the desirability of certain portions of this digital content. This instruction may, in some embodiments, be provided by the person reviewing the digital content and, more specifically, by that person's choice made during the course of reviewing the digital content. For example, the decision of a person reviewing a particular portion of digital content to fast-forward past a particular portion of the digital content may denote the lower desirability of that particular potion of the digital content. Moreover, the decision of the repeatedly review a particular portion of digital content may denote the high desirability of that particular portion of digital content.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer system comprising:
   one or more processors; and
   one or more computer storage media storing computer-usable instructions that, when used by the one or more processors, cause the one or more processors to:
   transmit, via a media stream adapted to stream a piece of digital content having a plurality of frames, a graphical representation of cumulative usage data associated with the piece of digital content, wherein the cumulative usage data corresponds to at least one database entry stored in a database and references a number of times each frame of the plurality of frames has been streamed, and wherein the graphical representation includes a plurality of portions that each corresponds to a subset of frames in the plurality of frames;
   receive selection event data that corresponds to a selected portion of the plurality of portions, wherein the selected portion is selected for transmission via the media stream; and
   modify, based on the received selection event data, at least a first database entry of the at least one database entry that corresponds to the selected portion to update the number of times each frame of the corresponding subset of frames has been streamed.

2. The computer system of claim 1, wherein the computer-usable instructions further cause the one or more processors to:
   provide for a display, for each portion of the plurality of portions, a thumbnail that depicts a particular frame of the corresponding subset of frames.

3. The computer system of claim 2, wherein the particular frame is a first frame of the corresponding subset of frames.

4. The computer system of claim 2, wherein the particular frame is a most-streamed frame of the corresponding subset of frames.

5. The computer system of claim 1, wherein the cumulative usage data further references a different number of times each frame of the plurality of frames has been skipped.

6. The computer system of claim 1, wherein the instructions further cause the one or more processors to: communicate, based on the received selection event data, updated cumulative usage data to a different computing device via another media stream adapted to stream the piece of digital content.

7. The computer system of claim 1, wherein based on a determination that at least a first frame of the corresponding subset of frames is viewed in a fast forward manner, the number of times that at least the first frame has been streamed is reduced.

8. A computer system comprising:
   one or more processors; and
   one or more computer storage media storing computer-usable instructions that, when used by the one or more processors, cause the one or more processors to:
   provide for display a graphical histogram that corresponds to cumulative usage data structured in at least one database entry stored a database and is associated with a digital content file, wherein the cumulative usage data references a number of times each frame of the digital content file has been streamed; and
   receive, via a user selection interface, a selected portion of a plurality of portions in the displayed graphical histogram, wherein the selected portion corresponds to at least one frame of the digital content file, and wherein based on the selected portion, at least a first database entry of the at least one database entry that corresponds to the at least one frame of the digital content file is modified based on the selected portion.

9. The computer system of claim 8, wherein the cumulative usage data references a number of times each frame of the digital content file has been streamed.

10. A computer-implemented method comprising:
    providing for display a graphical histogram that is based on cumulative usage data structured in a database and associated with a piece of digital content having a plurality of portions, wherein a plurality of database entries corresponds to the cumulative usage data and references a number of times each portion in the plurality of portions has been streamed, and wherein the graphical histogram presents a plurality of vertical bars that each represents a corresponding portion of the piece of digital content and the number of times the corresponding portion has been streamed;
    receiving a selection that corresponds to a particular vertical bar of the presented plurality of vertical bars; and
    providing for display a particular portion of the piece of digital content based on the received selection, wherein at least one database entry of the plurality of database entries that corresponds to a portion of the cumulative usage data referencing the number of times the particular portion has been streamed is modified based on the received selection.

11. The computer-implemented method of claim 10, further comprising-providing for display a user selection interface configured to facilitate the selection that corresponds to the particular vertical bar of the presented plurality of vertical bars.

12. A non-transitory machine-readable medium having instructions stored thereon which when executed by at least one processor of a machine, cause the machine to perform operations comprising:
    receiving cumulative usage data included in a beginning of a digital content media stream, wherein the cumulative usage data corresponds to at least one database entry of a database that references a number of times each portion of a plurality of portions in the piece of digital content has been accessed;
    providing for display, via a user interface pane, the cumulative usage data in a graphical histogram format, wherein the displayed cumulative usage data in the graphical histogram format presents a plurality of vertical bars that each corresponds to one of the plurality of portions and further references a number of times the corresponding portion has been accessed;
    receiving a selection that corresponds to a particular vertical bar of the presented plurality of vertical bars; and
    providing for display, via the digital content media stream a particular portion of the plurality of portions based on the received selection, wherein at least one database entry of the database that references the number of times the particular portion has been accessed is modified based on the received selection.

13. The non-transitory machine readable medium of claim 12, wherein a vertical bar of the presented plurality of vertical bars is presented with an associated thumbnail image, wherein the associated thumbnail image depicts an image associated with a particular frame of a plurality of frames in the corresponding portion.

14. The non-transitory machine readable medium of claim 12, wherein the cumulative usage data further includes a user-provided preference value associated with each portion of the plurality of portions, wherein at least one of the user-provided preference value and a time value that corresponds to a particular frame in a plurality of frames of the digital content media stream is employable as a search parameter to identify a specific portion in the plurality of portions.

15. The non-transitory machine readable medium of claim 13, wherein the thumbnail image is depicted based on a determination that the particular frame of the plurality of frames in the corresponding portion is accessed a greatest number of times.

\* \* \* \* \*